(12) United States Patent
Takimoto

(10) Patent No.: US 12,353,189 B2
(45) Date of Patent: Jul. 8, 2025

(54) METHOD FOR CREATING AMOUNT OF WEAR ESTIMATION MODEL, METHOD FOR ESTIMATING AMOUNT OF WEAR, AMOUNT OF WEAR ESTIMATION MODEL CREATION APPARATUS, PROGRAM FOR CREATING AMOUNT OF WEAR ESTIMATION MODEL, AMOUNT OF WEAR ESTIMATION APPARATUS, AND PROGRAM FOR ESTIMATING AMOUNT OF WEAR

(71) Applicant: KYOCERA CORPORATION, Kyoto (JP)

(72) Inventor: Norihiro Takimoto, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 324 days.

(21) Appl. No.: 17/904,104

(22) PCT Filed: Feb. 12, 2021

(86) PCT No.: PCT/JP2021/005197
§ 371 (c)(1),
(2) Date: Aug. 11, 2022

(87) PCT Pub. No.: WO2021/166790
PCT Pub. Date: Aug. 26, 2021

(65) Prior Publication Data
US 2023/0072363 A1 Mar. 9, 2023

(30) Foreign Application Priority Data
Feb. 17, 2020 (JP) .................................. 2020-024096

(51) Int. Cl.
G05B 19/4065 (2006.01)
G05B 19/4067 (2006.01)

(52) U.S. Cl.
CPC ..... G05B 19/4065 (2013.01); G05B 19/4067 (2013.01)

(58) Field of Classification Search
CPC ............ G05B 19/4065; G05B 19/4067; G05B 2219/32356; B23Q 17/09; B23Q 17/20
See application file for complete search history.

(56) References Cited

U.S. PATENT DOCUMENTS 5,251,144 A * 10/1993 Ramamurthi ...... G05B 19/4065
706/904
2007/0135803 A1* 6/2007 Belson ............... A61B 1/00154
606/1
(Continued)

FOREIGN PATENT DOCUMENTS

JP      H6170696 A     6/1994
JP      2001205545 A   7/2001
(Continued)

*Primary Examiner* — Ziaul Karim
(74) *Attorney, Agent, or Firm* — HAUPTMAN HAM, LLP

(57) ABSTRACT

In a data obtaining step, a data obtaining unit may obtain certain data at a plurality of sampling times. The data may include measurement information regarding the amount of wear of the cutting tool and measurement information regarding a physical quantity of the cutting tool during cutting. In a clustering step, a clustering unit may cluster a plurality of pieces of the obtained data on the basis of the measurement information regarding the physical quantity included in each of the plurality of pieces of data. In a model creation step, a model creation unit may create, for each of clusters on the basis of the measurement information regarding the physical quantity and the measurement information regarding the amount of wear included in the data, a model for obtaining estimation information regarding the amount of wear from new measurement information regarding the physical quantity.

15 Claims, 17 Drawing Sheets

(56) References Cited

U.S. PATENT DOCUMENTS

| | | | | |
|---|---|---|---|---|
| 2016/0091393 A1* | 3/2016 | Liao | ............... | G01M 13/00 |
| | | | | 702/34 |
| 2016/0157751 A1* | 6/2016 | Mahfouz | ............ | A61B 5/062 |
| | | | | 600/409 |
| 2017/0235848 A1* | 8/2017 | Van Dusen | ......... | G06Q 10/101 |
| | | | | 705/12 |
| 2019/0240804 A1* | 8/2019 | Zhang | ............... | G06N 20/00 |

FOREIGN PATENT DOCUMENTS

| | | | |
|---|---|---|---|
| JP | 2004255514 A | 9/2004 |
| JP | 2011230206 A | 11/2011 |
| JP | 2019139755 A | 8/2019 |
| JP | 202015106 A | 1/2020 |

* cited by examiner

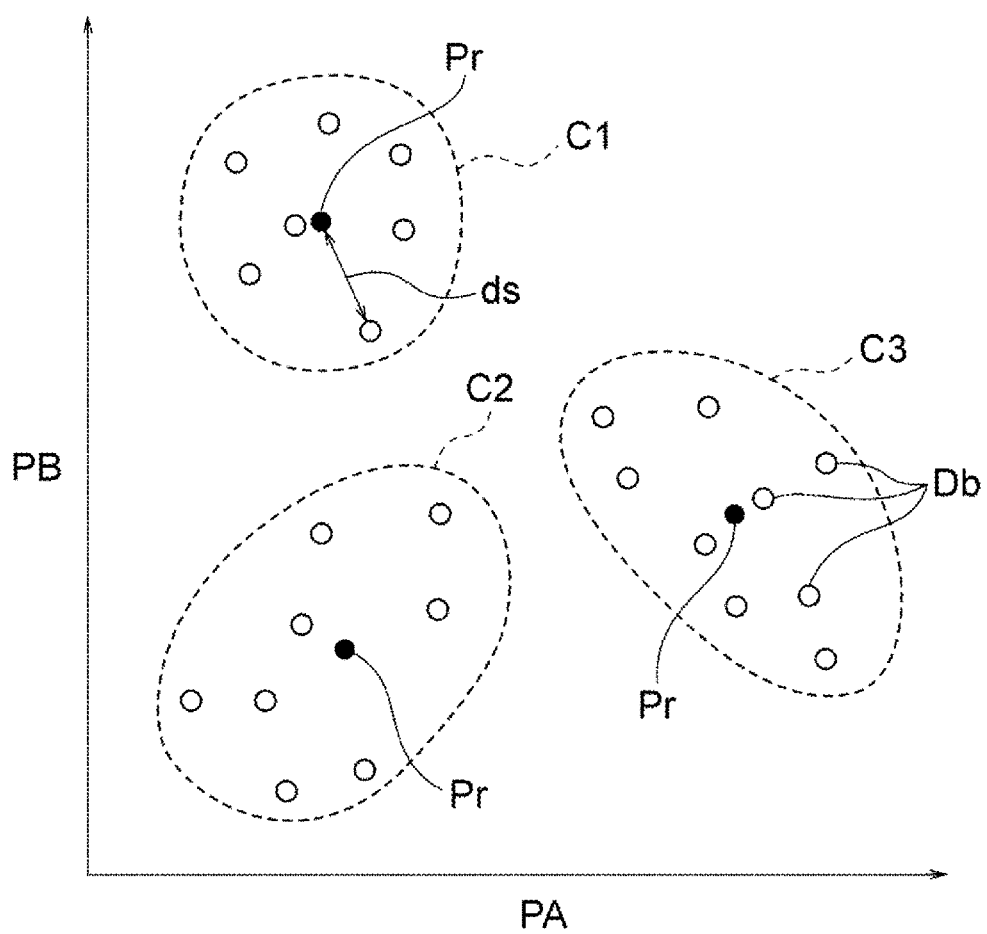

FIG. 8
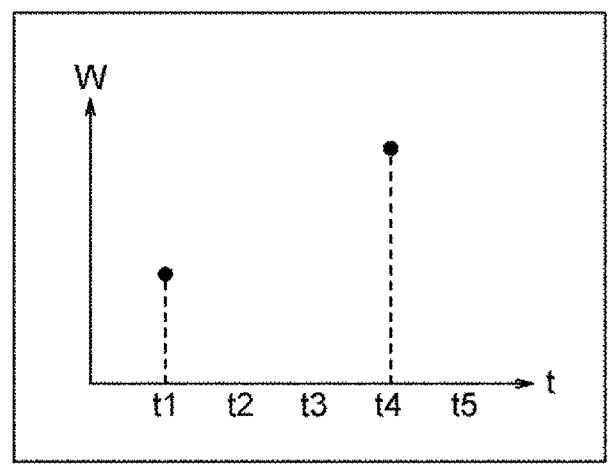
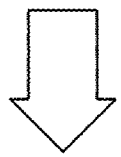
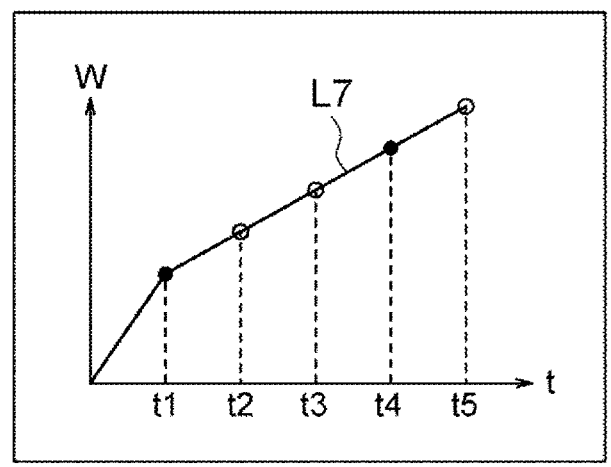

METHOD FOR CREATING AMOUNT OF WEAR ESTIMATION MODEL, METHOD FOR ESTIMATING AMOUNT OF WEAR, AMOUNT OF WEAR ESTIMATION MODEL CREATION APPARATUS, PROGRAM FOR CREATING AMOUNT OF WEAR ESTIMATION MODEL, AMOUNT OF WEAR ESTIMATION APPARATUS, AND PROGRAM FOR ESTIMATING AMOUNT OF WEAR

RELATED APPLICATIONS

The present application is a National Phase of International Application Number PCT/JP2021/005197, filed Feb. 12, 2021, and claims priority based on Japanese Patent Application No. 2020-024096, filed Feb. 17, 2020.

TECHNICAL FIELD

The present disclosure may relate to a method for creating an amount of wear estimation model, a method for estimating an amount of wear, an amount of wear estimation model creation apparatus, a program for creating an amount of wear estimation model, an amount of wear estimation apparatus, and a program for estimating an amount of wear, which are used to estimate the amount of wear of a cutting tool.

BACKGROUND ART

Techniques for determining an end of life (i.e., a time to replace) of a cutting tool are known. Examples will be described hereinafter.

In Japanese Unexamined Patent Application Publication No. 2001-205545 (PTL 1), an acceleration sensor that detects vibration of a cutting tool may be provided. A peak value of vibration of a cutting tool may change in accordance with wear or a partial breakage of the cutting tool. In PTL 1, therefore, it may be determined that an end of life has come when a peak value exceeds a certain threshold. PTL 1 may also propose, in view of a fact that a vibration level changes in accordance with processing conditions, that the threshold be changed in accordance with the processing conditions.

In Japanese Unexamined Patent Application Publication No. 2011-230206 (PTL 2), it may be determined, in view of a fact that a processing load increases (e.g., torque required to rotate the cutting tool increases) as a tool becomes dull, that an end of life has come when the processing load exceeds a certain threshold. PTL 2 may also propose, in view of a fact that the processing load changes depending on hardness of a workpiece (a workpiece), that the threshold be changed in accordance with hardness of a workpiece.

SUMMARY OF INVENTION

A method for creating an amount of wear estimation model according to an aspect of the present disclosure may include a data obtaining step, a clustering step, and a model creation step. The data obtaining step may obtain certain data for at least one cutting tool at a plurality of sampling times. The certain data may include measurement information regarding an amount of wear of the cutting tool and measurement information regarding a physical quantity of the cutting tool during cutting. The physical quantity may correlate with the amount of wear. The clustering step may cluster a plurality of pieces of the obtained data on a basis of the measurement information regarding the physical quantity included in each of the plurality of pieces of data. The model creation step may create, for each of clusters on a basis of the measurement information regarding the physical quantity and the measurement information regarding the amount of wear included in the data, a model for obtaining estimation information regarding the amount of wear from new measurement information regarding the physical quantity.

A method for estimating an amount of wear according to another aspect of the present disclosure may be a method for estimating an amount of wear using the model created by the method for creating an amount of wear estimation model. The method for estimating an amount of wear may include a measurement information obtaining step, a cluster selection step, and an estimation step. The measurement information obtaining step may obtain measurement information regarding the physical quantity of a cutting tool different from the cutting tool used to create the model. The cluster selection step may select, among the plurality of clusters, a cluster into which the measurement information regarding the physical quantity obtained in the measurement information obtaining step is classified. The estimation step may obtain estimation information regarding the amount of wear by applying the measurement information regarding the physical quantity obtained in the measurement information obtaining step to the model corresponding to the selected cluster.

An amount of wear estimation model creation apparatus according to another aspect of the present disclosure may include a data obtaining unit, a clustering unit, and a model creation unit. The data obtaining unit may obtain certain data for at least one cutting tool at a plurality of sampling times. The data may associate measurement information regarding an amount of wear of the cutting tool and measurement information regarding a physical quantity of the cutting tool during cutting with each other. The physical quantity may correlate with the amount of wear. The clustering unit may cluster a plurality of pieces of the obtained data on a basis of the measurement information regarding the physical quantity included in each of the plurality of pieces of data. The model creation unit may create, for each of clusters on a basis of the measurement information regarding the physical quantity and the measurement information regarding the amount of wear included in the data, a model for obtaining estimation information regarding the amount of wear from new measurement information regarding the physical quantity.

A program for creating an amount of wear estimation model according to another aspect of the present disclosure may cause a computer to function as the amount of wear estimation model creation apparatus.

An amount of wear estimation apparatus according to another aspect of the present disclosure may be an apparatus that estimates an amount of wear using the model created by the amount of wear estimation model creation apparatus. The amount of wear estimation apparatus may include a measurement information obtaining unit, a cluster selection unit, and an estimation unit. The measurement information obtaining unit may obtain measurement information regarding the physical quantity of a cutting tool different from the cutting tool used to create the model. The cluster selection unit may select, among the plurality of clusters, a cluster into which the measurement information regarding the physical quantity obtained by the measurement information obtaining unit may be classified. The estimation unit may estimate estimation information regarding the amount of wear by applying the measurement information regarding the physical quantity obtained by the measurement information obtaining unit to the model corresponding to the selected cluster.

A program for estimating an amount of wear according to another aspect of the present disclosure may cause a computer to function as the amount of wear estimation apparatus.

BRIEF DESCRIPTION OF DRAWINGS

FIG. 5 is a conceptual diagram illustrating clustering.

FIG. 8 is a conceptual diagram illustrating an example of a method for interpolating measured values of the amount of wear.

Figure 1:
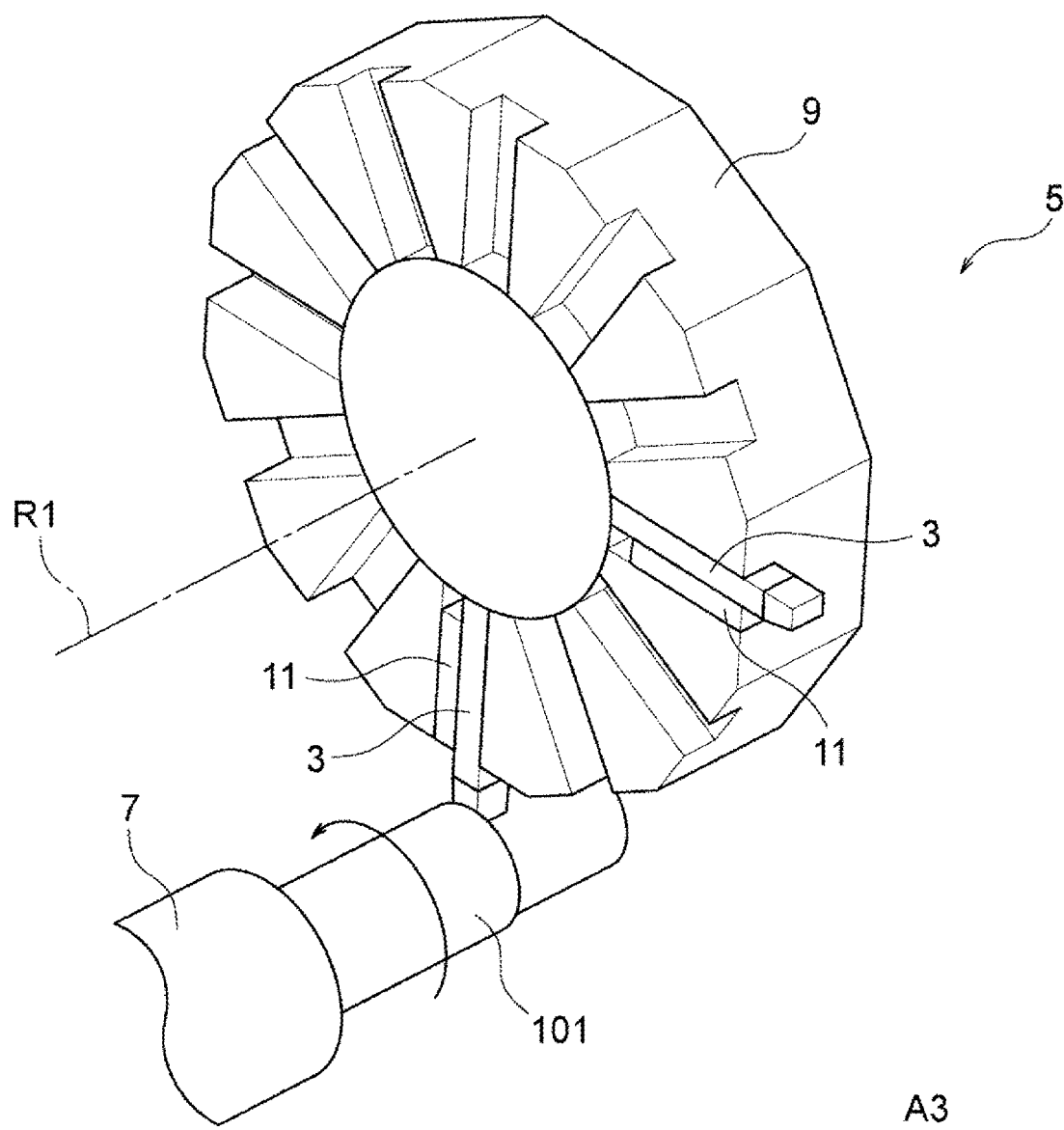
FIG. 1 is a perspective view illustrating key parts of a machine tool according to an embodiment.

DESCRIPTION OF EMBODIMENTS (Targets of Estimation of Amount of Wear)

As understood from later description, a method for estimating an amount of wear of a cutting tool according to an embodiment can be used for various cutting tools and machine tools. For example, a cutting tool may be a single-point cutting tool that cuts a turning workpiece or a rotary tool that rotates to cut a workpiece. Examples of the single-point cutting tool will be described later. A rotary tool may be, for example, a drill or an endmill. As understood from above, a machine tool may be, for example, one that rotates a workpiece (e.g., a lathe), one that rotates a cutting tool (e.g., a milling machine or a machining center), or a multifunction tool capable of rotating a workpiece and a cutting tool.

Examples of a cutting tool and a machine tool will be described hereinafter. In description of the present embodiment, reference numerals given to the cutting tool and the machine tool described hereinafter as examples might be used for convenience even when a cutting tool and a machine tool different from those described hereinafter are referred to.

(Example of Machine Tool)

FIG. 1 may be a perspective view illustrating key parts of a machine tool 1. In FIG. 1, a Cartesian coordinate system defined by an A1-axis, an A2-axis, and an A3-axis may be given for convenience. This coordinate system may be essentially an absolute coordinate system, and a relative relationship between the coordinate system and vertical and horizontal directions may be arbitrary.

The machine tool 1 may be, for example, achieved as a turning center (a type of lathe). For example, the machine tool 1 may cut a workpiece 101 (workpiece) by bringing a single-point cutting tool (a tool bit etc.) as a cutting tool 3 into contact with the workpiece 101, which rotates about an axis parallel to the A1-axis. Such a cutting tool 3 may be, for example, an outer diameter machining tool, an inner diameter machining tool, a grooving tool, a cutting-off tool, or the like. Although not particularly illustrated, the machine tool 1 may be capable of cutting the workpiece 101 by rotating a rotary tool (a drill, an endmill, etc.) as a cutting tool 3 with the rotation of the workpiece stopped.

The machine tool 1 may include the cutting tool 3 and a machine body 5 in which the cutting tool 3 is set. The machine body 5 may include, for example, a spindle 7 for holding the workpiece 101 and a turret 9 (tool holder) for holding the cutting tool 3.

The spindle 7 coaxially may hold the workpiece 101, for example, in a direction parallel to the A1-axis and rotates about a central axis parallel to the A1-axis. The machine tool 1 may include one spindle 7 or two or more spindles 7. The spindle 7 may be capable of making parallel translation.

The turret 9 may be a substantially disk-shaped member and capable of holding a plurality of cutting tools 3 along a periphery thereof. FIG. 1 may illustrate only two cutting tools 3. The turret 9 can make parallel translation, for example, on an A1-A3 plane. When the turret 9 makes parallel translation, a cutting tool 3 at a certain position of the turret 9 (a cutting tool 3 on a −A3 side in the illustrated example) may come into contact with the workpiece 101 to cut the workpiece 101. The turret 9 may also be capable of making parallel translation in an A2 direction. The turret 9 may be capable of rotating, for example, about an axis of rotation R1, which is eccentric to an axis of rotation of the spindle 7. The cutting tool 3 used to cut the workpiece 101 (i.e., the cutting tool 3 located on the −A3 side), for example, may be thus replaced.

The turret 9 may hold a cutting tool 3 on a front surface (+A1 side) thereof or a peripheral surface thereof around the axis R1, instead. Any appropriate specific mechanism for holding a cutting tool 3 may be used. In the illustrated example, cutting tools 3 may be stored in grooves formed in the turret 9 along with auxiliary members 11.

(Example of Cutting Tool)

Figure 2:
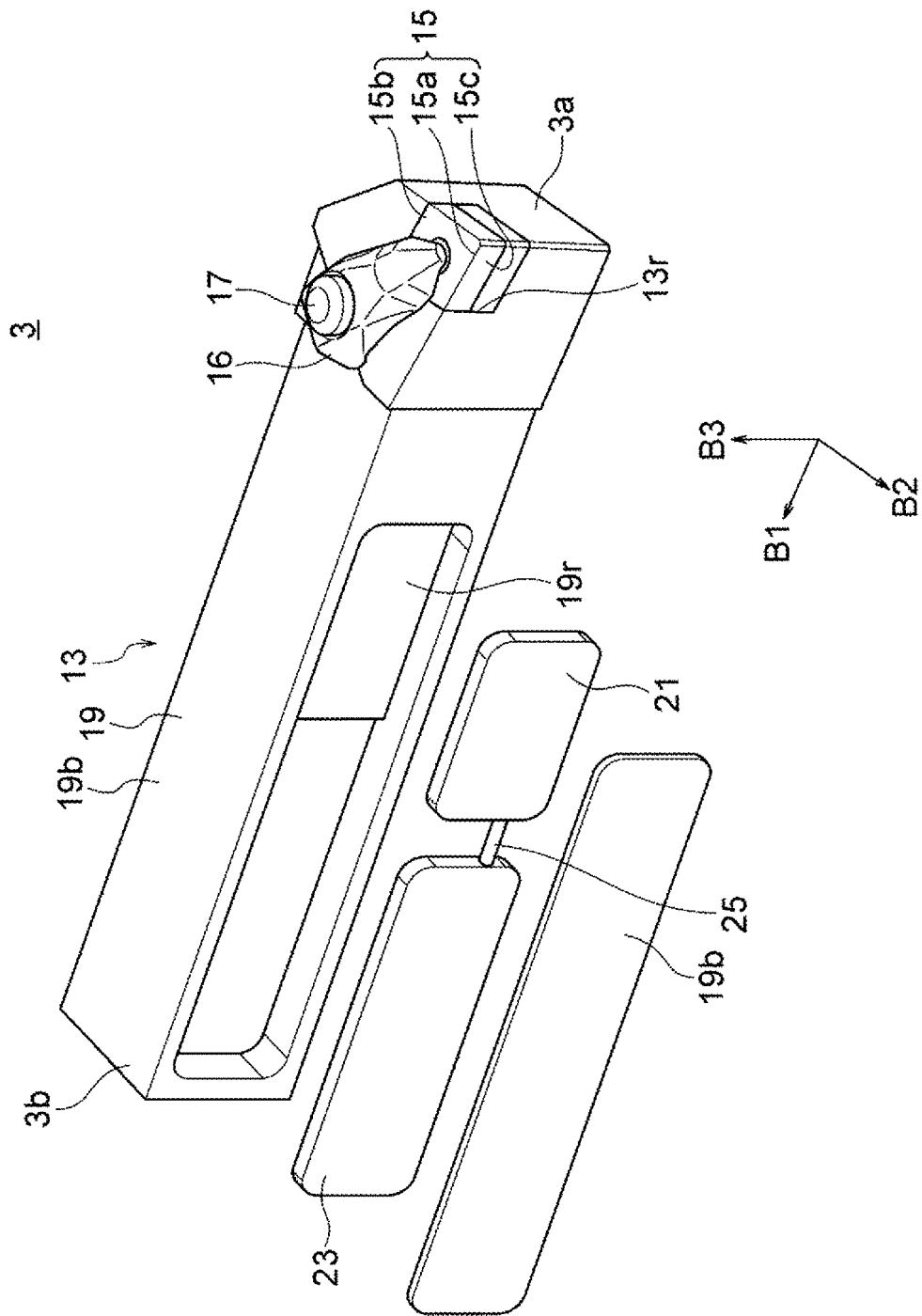
FIG. 2 is an exploded perspective view of a cutting tool included in the machine tool illustrated in FIG. 1.

FIG. 2 may be an exploded perspective view of the cutting tool 3. In FIG. 2, a Cartesian coordinate system defined by a B1-axis, a B2-axis, and a B3-axis, which are fixed, may be given to the cutting tool 3 for convenience. When the illustrated cutting tool 3 is located on the −A3 side in FIG. 1, for example, the B1-axis, the B2-axis, and the B3-axis may correspond to the A3-axis, the A1-axis, and the A2-axis, respectively.

The cutting tool 3 may be capable of executing basic functions relating to cutting of the workpiece 101 (functions as an ordinary cutting tool) and functions relating to estimation of wear. A configuration relating to the former functions will be mainly described hereinafter, and a configuration relating to the latter functions will be described later.

The cutting tool 3 may have a substantially rod shape, for example, and may include a first end 3a and a second end 3b. The cutting tool 3 includes a cutting edge 15a on a side of the first end 3a (e.g., a side of the first end 3a relative to a longitudinal center). A part of the cutting tool 3 on a side of the second end 3b relative to the cutting edge 15a may be held by the turret 9, and the cutting edge 15a may come into contact with the workpiece 101. The workpiece 101 may be thus cut.

The cutting tool 3 may be configured, for example, as a throwaway bit, whose cutting edge is replaceable. More specifically, for example, the cutting tool 3 may include a holder 13 (shank) having a substantially rod shape attached to the turret 9 and an insert 15 attached to a top of the holder 13. The insert 15 may include the cutting edge 15a. A single-point cutting tool as a cutting tool 3 is not limited to a throwaway bit, and may be, for example, a solid tool whose cutting edge and shank are formed as a unit or a brazed tool whose cutting edge is brazed to a shank thereof.

An outer shape of the holder 13 may be, for example, a rod extending from the first end 3a to the second end 3b. A cross-section (a section perpendicular to a longitudinal direction) of the holder 13 may have any appropriate shape, and may be rectangular in the illustrated example. The size of the holder 13 is not particularly limited. An example may be as follows. Length from the first end 3a to the second end 3b may be 50 mm to 200 mm. Length of the holder 13 in a direction (a B2 direction or a B3 direction) perpendicular to the longitudinal direction may be 5 mm to 30 mm.

The insert 15 may also be called a throwaway tip. A part or the entirety of the insert 15 may form an edge part that directly contributes to cutting. The insert 15 may include the cutting edge 15a, a cutting face 15b and a flank 15c perpendicular to each other across the cutting edge 15a. The cutting edge 15a may directly contribute to the cutting of the workpiece 101. The cutting face 15b, too, can directly contribute to the cutting and may have an area to which chip flows. The flank 15c may contribute to preventing the insert 15 and the workpiece 101 from coming into contact with each other unnecessarily.

A direction in which the insert 15 is mounted on the holder 13 may be changed so that the cutting edge 15a, the cutting face 15b, and the flank 15c for cutting can be changed. For example, the direction in which the insert 15 is mounted on the holder 13 may be rotated about an axis parallel to the B3-axis (e.g., rotated by 180° in the illustrated example), or a front surface and a back surface (surfaces perpendicular to the B3-axis) may be switched.

The insert 15 may have any appropriate shape in accordance with various circumstances such as a type of processing and the changes in the direction. In the illustrated example, the insert 15 may have a shape of a rectangular plate. Alternatively, the insert 15 may have a shape of a triangular plate or a hexagonal plate, or one of various other shapes. The size of the insert 15 is not particularly limited. In an example of dimensions, for example, the length of a side of the cutting face 15b may be 3 mm to 20 mm. In addition, for example, the height of the insert 15 in a direction perpendicular to the cutting face 15b may be 5 mm to 20 mm. A material of the insert 15 is not particularly limited, either. For example, the material of the insert 15 may be a cemented carbide or a cermet.

Various configurations may be employed to mechanically attach the insert 15 to the holder 13. In the illustrated example, the holder 13 may include a recess 13r storing at least a part of the insert 15. Such a recess 13r may generally be called a pocket. In addition, in the illustrated example, a screw 17 inserted into a clamp 16 that holds the insert 15 may be screwed into a female thread of the holder 13 to fix the insert 15 to the holder 13. Instead of the configuration in the illustrated example, a configuration in which a screw inserted into the insert 15 is screwed into the female thread of the holder 13, for example, may be used.

Since a combination of the holder 13 and the insert 15 is regarded as the cutting tool 3 in the present embodiment, a cutting tool 3 before the insert 15 is replaced and a cutting tool 3 after the insert 15 is replaced may be regarded as different cutting tools 3. In addition, when the direction in which the insert 15 is mounted on the holder 13 is changed or when the cutting edge 15a or the like for cutting is changed in view of the amount of wear of the cutting edge 15a or the like, a cutting tool 3 before the change and a cutting tool 3 after the change may be regarded as different cutting tools 3.

In the description of the present embodiment, therefore, a term, replacement of a cutting tool, for example, can refer to not only replacement of the entirety of the cutting tool but also replacement of the insert 15 or a change in the direction of the insert 15 (replacement of the cutting edge 15a or the like). A term, two or more cutting tools, can refer to not only two or more completely different cutting tools but also two or more cutting tools whose inserts 15 are different from each other or two or more cutting tools in which directions of inserts 15 are different from each other.

(Amount of Wear)

The amount of wear to be estimated in the present embodiment may be appropriately defined. For example, the amount of wear to be estimated may be the amount of wear of the flank 15c (flank wear), the amount of wear of the cutting face 15b (cutting face wear or crater wear), or the amount of wear of the cutting edge 15a. When there are two or more cutting edges or the like in a single cutting tool, any of the cutting edges may be a target. Although a case where one estimated value is obtained with respect to the amount of wear will be taken as an example in the description of the present embodiment, two or more estimated values may be obtained, instead, by obtaining an estimated value for each type of wear.

Specific indices indicating various types of amount of wear may also be appropriately set. For example, as wear progresses, the cutting edge 15a may recede, a part of the flank 15c wears from a side of the cutting edge 15a to a −B3 side, and a part of the cutting face 15b wears from the side of the cutting edge 15a to a −B2 side. The amount of wear of the cutting edge 15a, therefore, may be expressed, for example, by the amount of recession from an initial position. The amount of wear of the flank 15c or the cutting face 15b may be expressed by a width from the side of the cutting edge 15*a* (wear width). The amount of wear may be expressed by a value obtained by weighting and adding up such various indices, instead.

Any appropriate method may be used, too, to measure the amount of wear. For example, the index may be obtained by capturing an image of an edge part (e.g., the insert 15) of the cutting tool 3 in a stationary state (a state where cutting is not being performed) from an appropriate direction and analyzing the captured image.

(Physical Quantity Used to Estimate Amount of Wear)

In the method for estimating the amount of wear according to the present embodiment, for example, a physical quantity in a cutting tool during cutting may be measured, and the amount of wear may be estimated (estimation information is obtained) on the basis of a result (measurement information) of the measurement of the physical quantities. The physical quantity used for the estimation may be one of various physical quantities correlated with the amount of wear. For example, such physical quantities may include acceleration, velocity, angular acceleration, angular velocity, stress, distortion, vibration, and heat (temperature) caused in a cutting tool and force and torque (cutting resistance) applied to the cutting tool. Some of the above physical quantities might correlate with each other or essentially the same. For example, vibration may be variation in acceleration.

The physical quantity may be detected by a sensor provided for the cutting tool 3 or the machine body 5. For example, vibration or acceleration of a cutting tool may be detected by an acceleration sensor provided for the cutting tool or a tool holder (the turret 9 in the present embodiment) that holds the cutting tool. Examples of the tool holder other than the turret 9 may include, for example, a tool block that exists between the cutting tool and the turret 9 and a member that rotatably supports a main shaft that holds a rotary tool. The sensors may be spatially separate from the cutting tool. For example, an ammeter (sensor) may measure a current supplied to an electric motor for driving the cutting tool, and force or torque applied to the cutting tool may be identified (measured) on the basis of a result of the measurement of the current. In the following description, acceleration (i.e., vibration) will be mainly taken as an example of the physical quantity.

(Estimation Method)

An outline of the method for estimating the amount of wear according to the present embodiment will be described with reference to FIGS. 3A to 6B. These drawings may be conceptual diagrams for facilitating understanding. Values of the physical quantity and the amount of wear shown in the drawings, for example, therefore, might be significantly different from actual ones.

In the present embodiment, first, the amount of wear and a physical quantity correlated with the amount of wear may be measured while using a cutting tool 3, in order to obtain training data including the amount of wear and the physical quantity. Next, a model (e.g., an arithmetic expression) for estimating the amount of wear from the physical quantity may be created on the basis of the training data. When a cutting tool 3 other than the cutting tool 3 used to obtain the training data is used later, the physical quantity may be measured for the cutting tool 3. The amount of wear may be then estimated from the measured physical quantity. As a result, an end of life of the latter cutting tool 3, for example, can be determined without actually measuring the amount of wear.

(Obtaining Training Data)

Figure 3A:
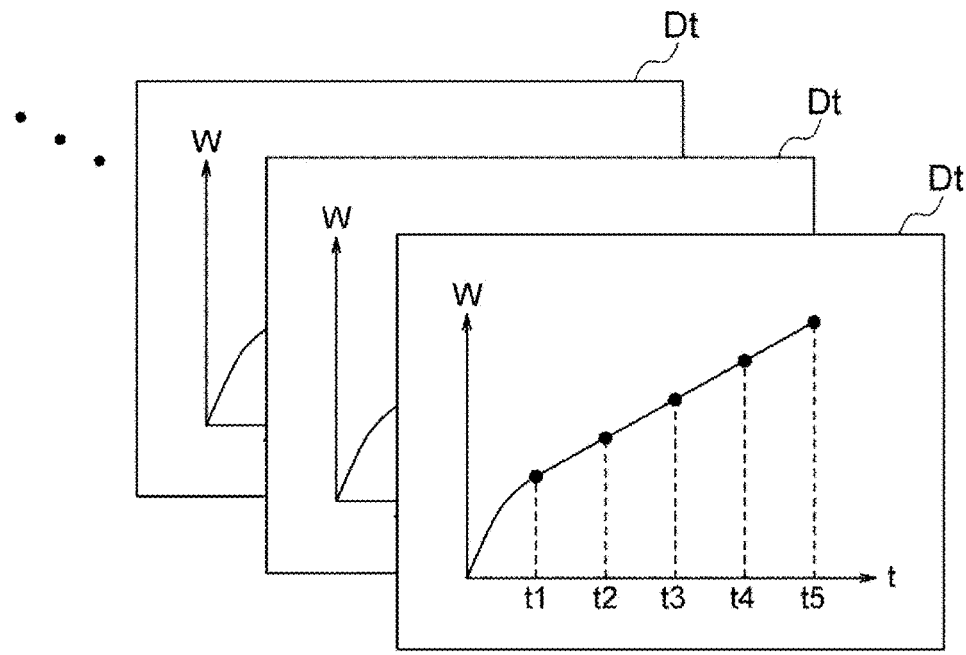
FIGS. 3A and 3B are diagrams conceptually illustrating how training data is obtained.
Figure 3B:
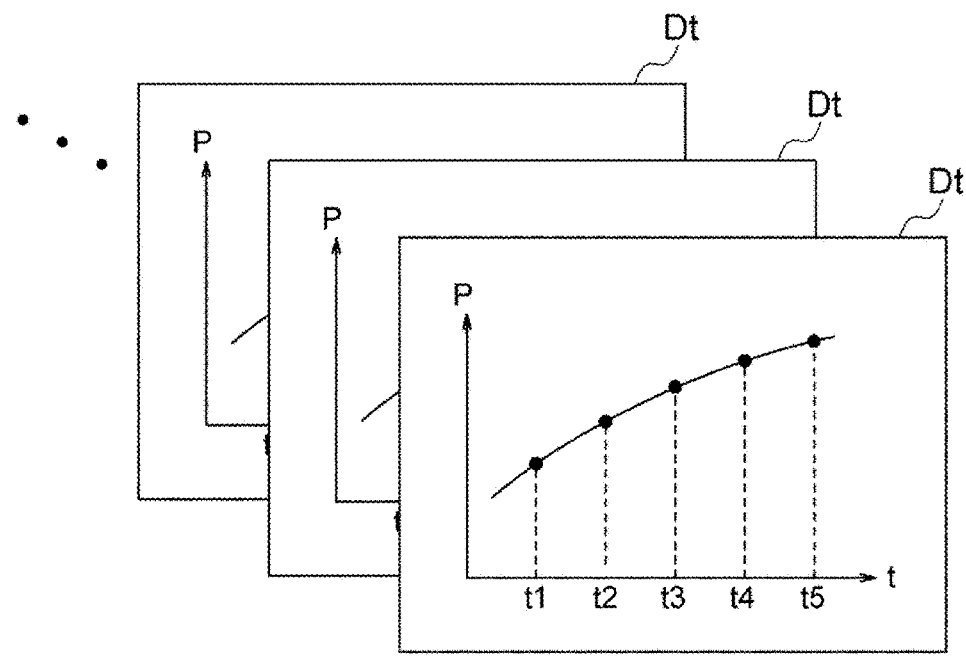

FIGS. 3A and 3B may be diagrams conceptually illustrating how training data is obtained. More specifically, FIG. 3A schematically may illustrate temporal changes in the amount of wear. In the figure, a horizontal axis t may represent time. A vertical axis W may represent the amount of wear. FIG. 3B may schematically illustrate temporal changes in the physical quantity. In the figure, a horizontal axis t may represent time. A vertical axis P may represent the physical quantity.

A length from a left end to a right end of the horizontal axis t may substantially correspond to, for example, a period of time from a beginning of use of a new cutting tool 3 to an end of life of the cutting tool 3 (time to replace). The horizontal axis t may indicate time for which the cutting tool 3 is being used for cutting, that is, periods of time for which the cutting tool 3 is not being used for cutting may be omitted. The periods of time for which the cutting tool 3 is not being used for cutting may include, for example, periods of time for which the machine tool 1 is not operating, periods of time for which the workpiece 101 is being replaced, and periods of time for which the cutting tool 3 and the workpiece 101 move relatively to each other in a noncontact state.

When a term time is used in the following description, the periods of time for which cutting is not being performed may be ignored unless otherwise noted. Since the periods of time for which cutting is not being performed are ignored, a period of time in which the physical quantity is measured during cutting and a period of time immediately after completion of the cutting in which the amount of wear is measured may be regarded as the same period of time.

As illustrated in FIG. 3A, when the cutting tool 3 is used to cut the workpiece 101, the amount of wear may increase over time. The amount of wear may be measured at appropriately set sampling times (t1, t2, t3, t4, and t5 in the illustrated example).

As illustrated in FIG. 3B, on the other hand, when the cutting tool 3 is used to cut the workpiece 101, the physical quantity may also change over time. The physical quantity may also be measured at the sampling times (t1, t2, t3, t4, and t5).

The amount of wear and the physical quantity may be thus measured at the same sampling times. Such measurement may be performed at a plurality of sampling times. As understood from later description, a "sampling time" is not limited to a time point but may have a certain length of time.

The same measurement as above may be performed each time a cutting tool 3 is replaced (includes, as described above, a case where only an insert 15 is replaced). As a result, a plurality of pieces of tool-specific data Dt regarding each cutting tool 3 may be obtained as conceptually indicated by a plurality of graphs stacked on one another in FIGS. 3A and 3B.

Sampling times may be appropriately set. For example, sampling times may be set on the basis of only periods of time for which cutting is being performed or on the basis of progress of processing, not time. An example of the latter case will be described. For example, an NC (numerical control) machine tool might repeatedly perform a cycle of processing (perform a plurality of cycles of processing) in which a plurality of types of operations are performed in certain order. In this case, a sampling time may be a time at which a certain operation is performed in each of the cycles. A plurality of sampling times, however, may be set in each cycle, instead.

From another perspective, the time at which the certain operation is performed in each of the cycles may be a time at which processing conditions (e.g., speed of the spindle 7 and feed speed of the cutting tool 3) are the same between the cycles. As understood from the above-described setting of sampling times based on operation, time herein may be conceptualized by progress of an operation, instead of minutes, seconds, and the like.

Intervals of sampling times may be regular or irregular. When a sampling time is a time at which a certain operation is performed in each of the cycles, for example, the sampling time may be set for each cycle and intervals may accordingly be regular. A sampling time may be set not for each cycle but for every two or more cycles, instead. Alternatively, sampling times may be set for any cycles and intervals thereof may be irregular.

The estimated amount of wear may be used to determine, for example, whether an end of life of a cutting tool (time to replace) has come. When the amount of wear reaches a certain threshold, for example, it may be determined that an end of life of a cutting tool has come. The measurement of the physical quantity and the amount of wear for training data may be performed, for example, until the amount of wear exceeds a threshold. The measurement, however, need not be performed until the amount of wear reaches the threshold. This is because, as understood from later description, measured values of the amount of wear can be extrapolated (interpolated) and/or an estimation model for the amount of wear may be used to estimate the amount of wear exceeding the amount of wear measured for the training data.

A sampling time may be set in an appropriate period between a beginning of use of a cutting tool 3 and an end of use (e.g., an end of life) of the cutting tool 3. For example, a sampling time may be set in a period other than periods that are singular in terms of wear or periods in which the amount of wear is significantly different from the threshold for determining an end of life (the amount of wear is small). As illustrated in FIG. 3A, for example, a cutting tool 3 may wear rapidly at a beginning of use (refer to a period before the time t1), and a rate of change in the amount of wear may stabilize thereafter. A sampling time may be set in a period other than such a period when rapid wear (initial wear) occurs.

A single cutting tool 3 can usually cut a plurality of workpieces 101 until an end of life thereof comes. For this reason, when element data db (refer to FIGS. 4A and 4B for a reference numeral) regarding a combination of the physical quantity and the amount of wear is obtained from a beginning of use of a cutting tool 3 and an end of use, for example, the element data Db may be obtained for a plurality of workpieces 101 for which the machine tool 1 performs the same cutting. The plurality of workpieces 101 may, for example, belong to different lots in a manufacturing process of uncut materials 101. The plurality of workpieces 101, however, may include only two or more workpieces 101 in the same lot, instead.

Figure 4A:
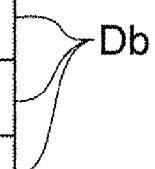
FIG. 4A is a diagram conceptually illustrating first accumulation data as training data.

FIG. 4A is a diagram conceptually illustrating first accumulation data Da as training data obtained in the above manner.

The first accumulation data Da may hold information regarding the physical quantity and information regarding the amount of wear at the same sampling times while associating the information regarding the physical quantity and the information regarding the amount of wear with each other. In other words, the first accumulation data Da may include a plurality of pieces of element data db, each of which holds the physical quantity and the amount of wear. In the illustrated example, information P1 regarding the physical quantity and information W1 regarding the amount of wear may be associated with each other as values at the same sampling time. Similarly, P2 and W2, P3 and W3, . . . , and Pn0 and Wn0 may be associated with each other.

As described later, information regarding the physical quantity included in element data db may include various pieces of information and need not be limited to one value. Information regarding the physical quantity may be, for example, time-series data over a certain period of time around a sampling time or one or more feature values calculated from the time-series data. Information regarding the amount of wear included in element data db may be, for example, a value. Information regarding the amount of wear, however, may include two or more values. The first accumulation data Da, the information regarding the physical quantity, and the information regarding the amount of wear may also include information that is not used to create a model.

The first accumulation data Da may be achieved, for example, by a plurality of pieces of tool-specific data Dt (FIGS. 3A and 3B) regarding a plurality of cutting tools 3. The first accumulation data Da, however, may be achieved by one piece of tool-specific data Dt regarding one cutting tool 3, instead. In addition, when the first accumulation data Da is constructed, data may be selected or rejected appropriately, that is, for example, element data db in which at least the physical quantity or the amount of wear is singular may be eliminated.

(Estimation Model in Comparative Example)

Figure 4B:
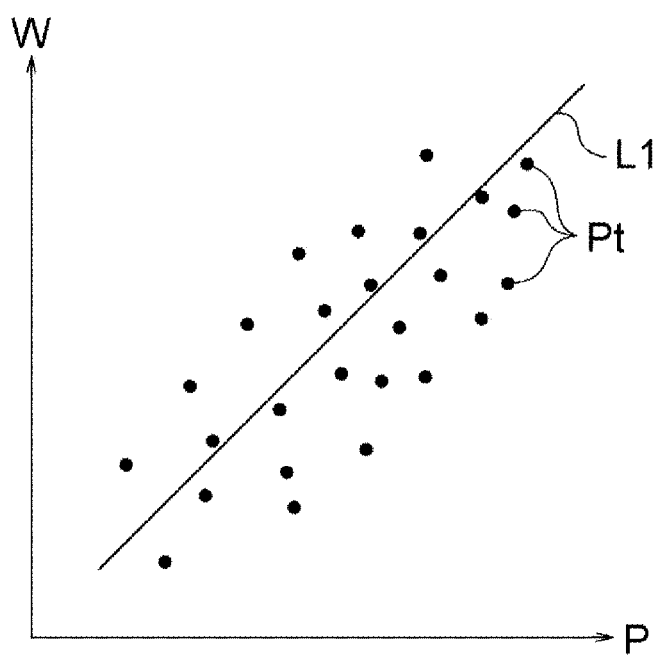
FIG. 4B is a conceptual diagram illustrating an estimation model in a comparative example.

FIG. 4B may be a conceptual diagram illustrating an estimation model in a comparative example. In the figure, a horizontal axis P may represent, as with the vertical axis P in FIG. 3B, a physical quantity correlated with the amount of wear. A vertical axis W may represent, as with the vertical axis W in FIG. 3A, the amount of wear. In the figure, points Pt may indicate relationships between the physical quantity and the amount of wear measured at the same sampling times. That is, relationships between the physical quantity and the amount of wear in the first accumulation data Da may be plotted.

In the comparative example, an estimation model indicated by a line L1 may be obtained through a regression analysis where the physical quantity is an explanatory variable and the amount of wear is an objective variable. The model may be, for example, an arithmetic expression for calculating the amount of wear from the physical quantity. The amount of wear may be then estimated by substituting the physical quantity measured for a cutting tool currently in use into the model indicated by the line L1. In the comparative example, one model may be created using all the element data db held in the first accumulation data Da.

(Estimation Model for Each Cluster)

In the present embodiment, a plurality of pieces of element data db included in first accumulation data Da may be classified into a plurality of clusters through clustering. A model for estimating the amount of wear from the physical quantity may be then created for each of the clusters. As a result, accuracy of estimating the amount of wear may improve.

(Clustering)

Clustering can be said, for example, to be classification of a plurality of elements (a plurality of pieces of element data db here) into a plurality of subsets without using any external criteria. In the clustering, for example, each of the plurality of pieces of element data db may be classified in such a way as to belong to only one cluster (hard or crisp clustering). In the clustering, however, each of the plurality of pieces of element data db may belong to two or more clusters (soft or fuzzy clustering).

A method used for clustering may be, for example, one of various known methods. For example, clustering may be hierarchical or non-hierarchical. Hierarchical clustering may be divisive or agglomerative and may employ, for example, Ward's method. Non-hierarchical clustering may be k-means. K-means will be mainly taken as an example in the following description.

In the clustering, information regarding the physical quantity among the information regarding the physical quantity and information regarding the amount of wear included in the element data db may be used. For example, the information regarding the physical quantity included in the element data db may include one or more types of feature value obtained from time-series data regarding the physical quantity, and the clustering may be performed on the basis of at least one of the one or more types of feature value. The at least one type of feature value used in the clustering may be the same as the information (e.g., the explanatory variable of the regression analysis) used as the training data in the creation of an estimation model, or a part or the entirety thereof may be different from the information.

FIG. 5 may be a conceptual diagram illustrating the clustering. A horizontal axis PA and a vertical axis PB both may represent information regarding the physical quantity included in element data db. Here, a case may be illustrated where clustering is performed on the basis of two feature values, namely a feature value represented by the vertical axis PA (hereinafter referred to as a feature value PA) and a feature value represented by the horizontal axis PB (hereinafter referred to as a feature value PB).

The feature values PA and/or PB may be different between the plurality of pieces of element data db. In the illustrated example, the plurality of pieces of element data db may be classified into three clusters C1, C2, and C3. As understood from the figure, the plurality of pieces of element data db may be clustered such that pieces of element data db whose feature values PA and feature values PB are close to one another are classified into the same cluster. In other words, pieces of element data db that are similar to one another (in terms of the feature values PA and PB) may be classified to the same cluster.

Similarity between pieces of element data db may be evaluated, for example, from a concept of distance. When a distance ds between a representative point Pr of a cluster and a piece of element data db is small in an illustrated coordinate system, for example, the piece of element data db may be similar to other pieces of element data db belonging to the cluster. In addition, for example, two pieces of element data db may be similar to each other when a distance therebetween is small. In the clustering, for example, an evaluation function including such a distance may be defined, and classification may be performed such that the evaluation function becomes an optimal value (e.g., a smallest value).

When a distance between each piece of element data db and a representative point Pr of a cluster to which the piece of element data db belongs is denoted by ds in k-means, for example, the sum of distances ds (the sum of distances ds of all the pieces of element data db) may be the evaluation function. Clustering may be then performed such that a value of the evaluation function becomes smallest. A representative value Pr of a cluster may be ultimately a center of gravity of coordinates of all pieces of element data db belonging to the cluster. Here, a center of gravity of each cluster may have, as a coordinate value along the axis PA, an average of feature values PA of all pieces of element data db in the cluster. Similarly, the center of gravity of each cluster may have, as a coordinate value along the axis PB, an average of feature values PB of all pieces of element data db in the cluster.

A specific procedure of k-means may be as follows. A process where a distance ds between a piece of element data db and a representative point Pr of each of a plurality of clusters C1 to C3 is calculated, a cluster with which the distance ds becomes smallest is identified, and the piece of element data db is caused to belong to the identified cluster may be performed for each of the plurality of element data db (defined as step A). Next, a center of gravity of each cluster may be calculated and determined as a new representative point Pr (defined as step B). Steps A and B may be repeated until positions of the representative points Pr converge.

In the above procedure, the plurality of pieces of element data db may be essentially classified such that the value of the evaluation function becomes smallest. In the first step A, representative points Pr may be randomly set. In actual processing, the conversion of the representative points Pr may be determined on the basis of whether allocation of the plurality of pieces of element data db to the representative points Pr in step B has changed. In k-means, a number k of clusters may be appropriately set.

For example, the number k of clusters may be set using a method employing a gap statistic or through a kernel principal component analysis. The gap statistic may be expressed as a logarithm of a ratio of a value of an evaluation function of a plurality of pieces of actual element data db to a value of an evaluation function of a plurality of pieces of fictitious element data db evenly distributed in a coordinate system. The number of clusters with which the gap statistic becomes largest may then be selected.

Figures 6A, 6B:
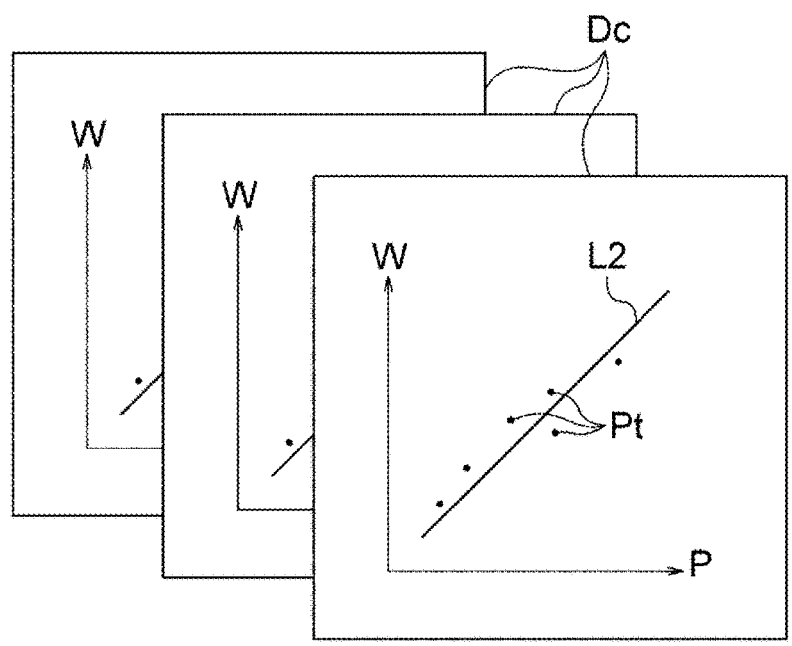
FIG. 6A is a diagram conceptually illustrating second accumulation data obtained by clustering the first accumulation data illustrated in FIG. 4A.
FIG. 6B is a conceptual diagram illustrating an estimation model for each cluster.

FIG. 6A may be a diagram conceptually illustrating second accumulation data Dd obtained by clustering the first accumulation data Da. In other words, the second accumulation data Dd may be data obtained by adding information regarding a result of the clustering to the first accumulation data Da.

The second accumulation data Dd may include a plurality of pieces of cluster-specific data Dc for a plurality of clusters, respectively. Each of the plurality of pieces of cluster-specific data Dc may include a plurality of pieces of element data db. The plurality of pieces of element data db included in each of the plurality of pieces of cluster-specific data Dc may be element data db classified into the same cluster as described above. In order to clarify that the plurality of pieces of element data db illustrated in FIG. 4A have been distributed among the plurality of pieces of cluster-specific data Dc, signs (P1-1, P1-2, P1-3, . . . , and P1-n1 and W1-1, W1-2, W1-3, . . . , and W1-n1) different from those illustrated in FIG. 4A may be illustrated as information regarding the physical quantity and information regarding the amount of wear. The plurality of pieces of element data db may be thus held by the second accumulation data Dd while being associated with the clusters to which the plurality of pieces of element data db belong.

FIG. 6A may be just a conceptual diagram. An actual data structure, therefore, may be different from one imagined from FIG. 6A. For example, each piece of the element data db may include information for identifying a cluster to which the piece of the element data db belongs, and all the pieces of the element data db may be stored without being distinguished from one another as illustrated in FIG. 4A.

(Creation of Estimation Model)

FIG. 6B may be a conceptual diagram illustrating an estimation model for each cluster. In the figure, a horizontal axis and a vertical axis may be the same as in FIG. 4B. As in FIG. 4B, a point Pt in the figure may indicate a relationship between the physical quantity and the amount of wear in each piece of element data db.

In the present embodiment, too, as in the comparative example illustrated in FIG. 4A, an estimation model (e.g., an arithmetic expression) indicated by a line L2 may be obtained through a regression analysis where the physical quantity is an explanatory variable and the amount of wear is an objective variable. A model, however, may be created for each cluster (for each piece of cluster-specific data Dc) as indicated by a plurality of graphs stacked on one another and reference numerals of the cluster-specific data Dc given for convenience.

Here, the models may be obtained through a simple regression analysis for convenience of description. The regression analysis, however, may be a multiple regression analysis, instead, where two or more explanatory variables are used. Alternatively, the models may be created using an AI (artificial intelligence) technique. That is, a model whose input is the physical quantity and whose output is the amount of wear may be created for each cluster using each piece of the cluster-specific data Dc as training data.

(Use of Estimation Models)

After estimation models are created, a physical quantity maybe measured for a cutting tool 3 whose amount of wear is to be estimated, and then a cluster to which measurement information (a measured value of a feature value) regarding the physical quantity belongs is determined on the basis of the measurement information regarding the physical quantity. The feature value at this time may be, for example, of the same type as that used to cluster the training data. Next, the measurement information (the measured value of the feature value) regarding the physical quantity of the cutting tool 3 whose amount of wear is to be estimated may be input to the estimation model corresponding to the selected cluster. The feature value at this time may be, for example, of the same type as that used to create the estimation models. The amount of wear of the cutting tool 3 may be thus estimated.

The cluster to which the measurement information regarding the physical quantity of the cutting tool 3 whose amount of wear is to be estimated belongs may be appropriately selected. For example, as in the case of the clustering, the cluster may be selected on the basis of a concept of similarity (distance). More specifically, for example, a cluster with which a distance ds between the measurement information regarding the physical quantity and a representative point Pr of a cluster becomes the smallest may be selected. Alternatively, for example, a cluster including a piece of element data db closest to the measurement information regarding the physical quantity may be selected. When a cluster is selected using the concept of distance, the distance may be of the same type as that used to cluster the training data. When the training data has been clustered through k-means, for example, the distances ds between the measurement information regarding the physical quantity of the cutting tool 3 to be estimated and the representative points Pr may be used.

Times at which the physical quantity of the cutting tool 3 to be estimated is measured may be appropriately set. For example, the physical quantity may be measured at regular sampling intervals. The sampling intervals may be the same as or different from ones (e.g., a length of time from t1 to t2) for the training data. The physical quantity may be measured at times desired by a user, instead.

(Specific Example of Information Regarding Physical Quantity)

As described above, one of various types of physical quantities may be used to estimate the amount of wear. The information regarding the physical quantity included in the training data, too, may be one of various types of information. In addition, the information (feature value) regarding the physical quantity directly used (clustered and/or used as an input of estimation models) to create estimation models may be one of various types of values. Here, acceleration will be taken as an example of the physical quantity, and information held by the training data and/or directly used to create estimation models will be described as an example.

Figure 7A:
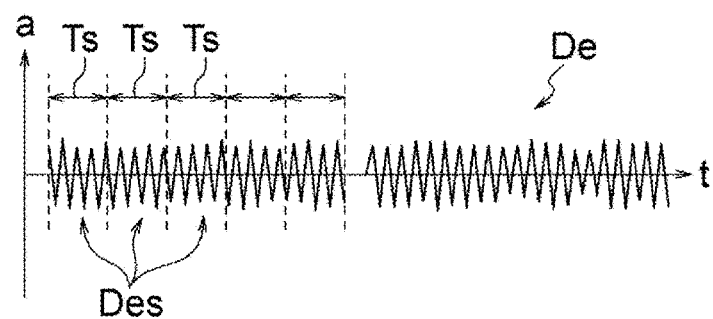
FIG. 7A is a schematic diagram illustrating an example of a result of measurement of acceleration.

FIG. 7A is a schematic diagram illustrating an example of a result of measurement of acceleration. In the figure, a horizontal axis t may represent time. A vertical axis a may represent acceleration. Wavy lines in the figure may indicate temporal changes in the measured acceleration.

In the figure, the horizontal axis t may correspond to an enlargement of the horizontal axis t illustrated in FIG. 3A. More specifically, the horizontal axis t in the figure from a left end to a right end may substantially correspond to, for example, a part or the entirety of processing (processing of one cycle) performed on a workpiece 101. A center of the horizontal axis may indicate, without omission, a state where the cutting tool 3 is not being used for cutting (a state where acceleration is not being caused).

While the cutting tool 3 is being used for cutting, the cutting tool 3 may vibrate, and acceleration may temporally change, forming waves as illustrated in the figure. The acceleration (i.e., vibration) may be measured at regular sampling intervals, and time-series data regarding the acceleration may be generated. The sampling intervals may be appropriately set in accordance with a frequency band (a frequency band highly correlated with wear may be focused upon. The same may hold in the following description) of the vibration caused in the cutting tool 3. For example, the sampling intervals may be 0.03 ms to 1 ms.

FIG. 7A may be regarded as a diagram conceptually illustrating time-series data De. The time-series data De may hold, for example, only measured values of acceleration in a structure with which order of the measurement of the values of acceleration can be identified (information regarding time points need not be held). Alternatively, for example, the time-series data may hold time points and values of acceleration measured at the time points while associating the time points and the values with each other (information regarding the time points may be held).

Various statistical values may be calculated on the basis of the time-series data De. As illustrated in FIG. 7A, for example, period-specific time-series data Des of a certain length of time Ts may be extracted from the time-series data De. A maximum value, a minimum value, an average, and/or a variance may be calculated on the basis of a plurality of measured values included in the period-specific time-series data Des. For example, these statistical values may use all the measured values included in the period-specific time-series data Des as samples or only values of peaks of waveforms obtained from the measured values included in the period-specific time-series data Des as samples. The length of time Ts may be appropriately set in accordance with a frequency band of vibration caused in the cutting tool 3, details of processing, and the like. For example, the length of time Ts may be 100 ms to 500 ms.

One or more types of statistical values obtained in the above manner may be included in element data db as information (feature value) of the physical quantity at each of the sampling times (t1 and the like in FIG. 3A). In this case, each period indicated by the length of time Ts may correspond to one sampling time. In the illustrated example, periods having the length of time Ts may be continuously set. As described above, however, only one sampling time may be set for each of one or more cycles, and in this case, periods having the length of time Ts may be temporally separate from one another.

Figure 7B:
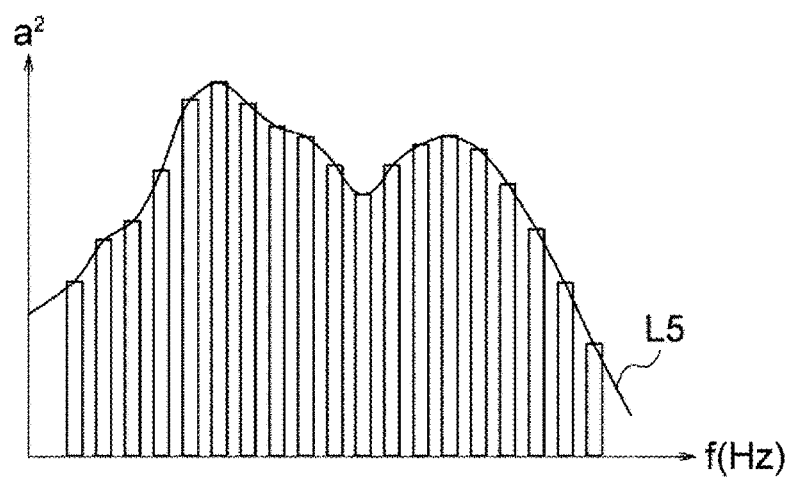
FIG. 7B is a diagram illustrating a frequency spectrum based on the result of the measurement of acceleration.

FIG. 7B may be a diagram illustrating a frequency spectrum obtained on the basis of time-series data De (Des). In the figure, a horizontal axis f may represent frequency. A vertical axis $a^2$ may represent acceleration squared.

As illustrated in the figure, a frequency spectrum may be obtained through a Fourier transform of divided period-specific time-series data Des, instead. Values of parameters indicating the frequency spectrum may be identified. Parameters indicating a frequency spectrum may be parameters indicating an envelope L5. For example, a spectral envelope may be obtained through LPC (linear predictive coding), and some or all of a plurality of LPC coefficients at this time may be used as parameters indicating a frequency spectrum.

Values of one or more types of parameters obtained in the above manner may be included in element data db as information (feature values) regarding the physical quantity at each of the sampling times (t1 and the like in FIG. 3A) instead of, or in addition to, the above-described statistical values. In this case, as described above, each period indicated by the length of time Ts may correspond to one sampling time. In addition, as described above, the periods may be continuously set or discretely set. The length of time Ts at a time when the statistical values are calculated and the length of time Ts at a time when the values of the parameters of the spectrum are calculated may be the same or different from each other.

The time-series data De may be deleted, for example, after the feature values (the statistical values and/or the parameters) are calculated. As a result, the amount of memory used and/or traffic can be reduced. The time-series data De, however, may be held by the first accumulation data Da and/or the second accumulation data Dd. In this case, for example, the entirety of the time-series data De may be held separately from the element data db, or the period-specific time-series data Des of the length of time Ts may be held by the element data db. When the time-series data De (or Des) is held by the first accumulation data Da and/or the second accumulation data Dd, it may be theoretically possible that the first accumulation data Da and/or the second accumulation data Dd do not hold feature values and that feature values are calculated as necessary, and such processing may be performed, instead.

Similarly, data regarding a frequency spectrum (data regarding a value of $a^2$ at each frequency) obtained on the basis of the period-specific time-series data Des of the length of time Ts, too, may be deleted after the values of the parameters (feature values) are calculated. The data regarding the frequency spectrum, however, may be held by the element data db, instead. In this case, it may be theoretically possible that the element data db does not hold values of parameters and that values of parameters are calculated as necessary, and such processing may be performed, instead.

(Interpolation of Measured Values of Amount of Wear)

FIGS. 3A and 3B may illustrate a mode in which the amount of wear W and the physical quantity P are measured at all the sampling times (t1, t2, t3, t4, and t5). At some sampling times, however, values (information) of the amount of wear may be obtained through interpolation. Values (information) of the amount of wear obtained as a result of interpolation may not be measured values (measurement information) in a strict sense. The values, however, may be used as measured values (measurement information) in the creation of an estimation model. In order to distinguish these interpolated values (information) from estimated values of the amount of wear obtained by inputting the physical quantity to an estimation model, the interpolated values might also be referred to as measured values (measurement information) for convenience.

FIG. 8 may be a conceptual diagram illustrating an example of a method for interpolating measured values of the amount of wear. A horizontal axis t and a vertical axis W of graphs illustrated in the figure may be the same as the horizontal axis t and the vertical axis W, respectively, of the graph illustrated in FIG. 3A.

As has already been mentioned with reference to FIG. 3A, a cutting tool may wear rapidly (initial wear) immediately after a beginning of use (refer to a period before the time t1 in FIG. 3A), and a rate of change in the amount of wear may stabilize thereafter. In addition, for example, the amount of wear that affects a determination as to an end of life may be the amount of wear after the initial wear. As indicated by black dots in the graph in an upper half of FIG. 8, the amount of wear may be measured at two sampling times (t1 and t4 in the illustrated example) after an end of the initial wear. As indicated by white dots in the graph in a lower half of FIG. 8, values of the amount of wear at other sampling times (t2, t3, and t5 in the illustrated example) may be calculated through interpolation.

The physical quantity, on the other hand, may be measured at all the sampling times as in FIG. 3B. As a result, element data db in which information regarding the physical quantity and information regarding the amount of wear are associated with each other may be obtained at all the sampling times (t1, t2, t3, t4, and t5 here).

As illustrated in the figure, for example, interpolation may be performed in two periods, namely a period (i.e., a period including t2 and t3) between the two sampling times (t1 and t4) at which measurement has been actually performed and a period (i.e., a period including t5) after the two sampling times. Interpolation, however, may be performed before the two sampling times (before the time t1), instead. Conversely, interpolation may be performed only in the period before the two sampling times at which measurement has been actually performed or only in the period after the two sampling times, instead. The two sampling times at which measurement is actually performed may be appropriately set. For example, the amount of wear of at least one cutting tool 3 may be measured at all the sampling times as illustrated in FIG. 3A. Two sampling times at which interpolation can be accurately performed may then be selected on the basis of a result of the measurement.

The interpolation may be performed using an appropriate method. In the illustrated example, a straight line L7 connecting the two sampling times (t1 and t4) to each other may be identified, and interpolation may be performed. That is, linear interpolation may be performed. When interpolation is performed in a period of initial wear, the interpolation may be performed on the basis of a straight line between a beginning of use and the first actual sampling time (t1) while assuming that there is no amount of wear at the beginning of use.

Although not particularly illustrated, there may be three or more sampling times at which the amount of wear is actually measured. In this case, the three or more sampling times may all be after the initial wear, or at least one of the sampling times may be set in the period of the initial wear. In addition, the interpolation is not limited to linear interpolation, and may be, for example, polynomial interpolation (other than linear interpolation) or spline interpolation, instead.

Specific sampling times at which the amount of wear is actually measured may be appropriately set. For example, as described above, one cutting tool 3 may be usually used to cut a plurality of workpieces 101. Two sampling times at which the amount of wear is actually measured, therefore, may be set after certain numbers of workpieces 101 are cut, such as after five workpieces 101 are cut and after fifteen workpieces 101 are cut, respectively. Alternatively, a sampling time may be set after a certain number of workpieces 101 are cut and then cutting of a next workpiece progresses to a certain stage (when a certain operation is completed).

(First Modification of Clustering)

Figure 9:
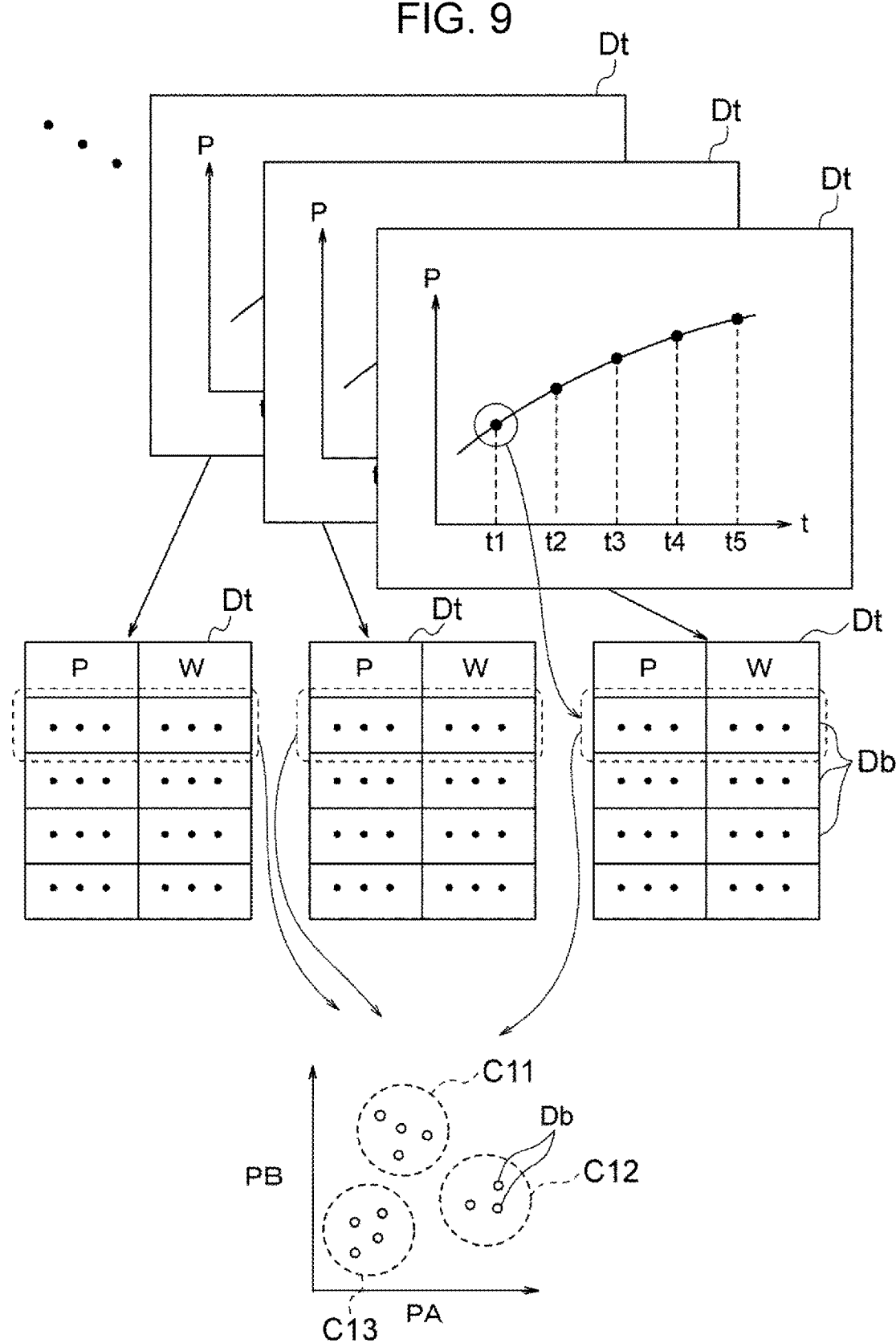
FIG. 9 is a conceptual diagram illustrating a first modification of the clustering.

FIG. 9 may be a conceptual diagram illustrating a first modification of the clustering.

As described with reference to FIGS. 3A and 3B, a plurality of pieces of tool-specific data Dt may be obtained for a plurality of cutting tools 3 in the above-described mode. In addition, as described with reference to FIG. 4A, first accumulation data Da including the plurality of pieces of tool-specific data Dt (i.e., a plurality of pieces of element data db included in each of the plurality of pieces of tool-specific data Dt) may be obtained. As described with reference to FIG. 5, the plurality of pieces of element data db included in the first accumulation data Da may be then clustered.

The above-described clustering may be performed regardless of which of cutting tools 3 (i.e., tool-specific data Dt) the plurality of pieces of element data db correspond. In the modification illustrated in FIG. 9, on the other hand, a plurality of pieces of element data db obtained for the same cutting tool 3 may be classified into the same cluster. Specifics will be described hereinafter.

Graphs in a top part of FIG. 9 may be the same as those illustrated in FIG. 3B. As understood from this, in the present modification, too, a plurality of pieces of tool-specific data Dt may be obtained as above. As expressed differently in a middle part of FIG. 9, each of the pieces of tool-specific data Dt may hold, for example, a plurality of pieces of element data db regarding a cutting tool 3.

A graph in a bottom part of FIG. 9, as with FIG. 5, conceptually may illustrate clustering of a plurality of pieces of element data db. As indicated by arrows pointing toward the graph in the bottom part of FIG. 9 from tables in the middle part, element data db at the same sampling time may be extracted from the plurality of pieces of tool-specific data Dt. As indicated by an arrow pointing toward a rightmost one of the tables in the middle part from a frontmost one of the graphs in the top part, element data db at the time t1 may be extracted in the illustrated example.

Clustering may be then performed on the basis of information regarding the physical quantity held by the extracted element data db. The clustering may be the same as that described with reference to FIG. 5, except that target element data db is not all the element data db included in the first accumulation data Da but element data db extracted from each of the plurality of pieces of tool-specific data Dt.

In each of the pieces of tool-specific data Dt, element data db that has not been extracted for the clustering may be classified in such a way as to belong to a cluster to which the extracted element data db belongs. In the illustrated example, a plurality of pieces of element data db at the time t1 may be clustered, for example, into clusters C11, C12, and C13. When element data db at the time t1 belongs to the cluster C11 in a piece of tool-specific data Dt, element data db at the other times t2, t3, t4, and t5 may also be classified in such a way as to belong to the cluster C11. The cluster-specific data Dc (FIGS. 6A and 6B) may be thus generated.

In the present disclosure, a process for performing clustering (in general terms) on some element data db and then classifying other element data db in accordance with a result of the clustering as described above will also be called clustering of the plurality of pieces of element data db. A term clustering, however, basically may refer to clustering in general terms for convenience. From another perspective, the clustering in a broad sense performed on the plurality of pieces of element data db can also be regarded as clustering in general terms performed on the plurality of pieces of tool-specific data Dt on the basis of the physical quantity of some element data db included in each of the pieces of tool-specific data Dt.

Sampling times of element data db extracted from the tool-specific data Dt may be appropriately set. For example, the sampling times may be ones after initial wear, when a rate of change in wear stabilizes. When measured values of the amount of wear are interpolated as described with reference to FIG. 8, for example, element data db at one of sampling times at which the amount of wear is actually measured may be extracted. More specifically, for example, element data db may be extracted after a certain number of workpieces 101 are cut or after a certain number of workpieces 101 are cut and then cutting of a next workpiece progresses to a certain stage. Whether sampling times are the same between a plurality of pieces of tool-specific data Dt may be determined, for example, on the basis of time for which a cutting tool 3 has been used for cutting since a beginning of use of the cutting tool 3 (includes time conceptualized in accordance with the progress of cutting as described above).

In the above description, only one piece of element data db may be extracted from each of pieces of tool-specific data Dt. Two or more pieces of element data db, however, may be extracted from each of pieces of tool-specific data Dt, instead. Information regarding the physical quantity of the two or more pieces of element data db may be used as separate pieces of information, and a plurality of pieces of tool-specific data Dt (not the element data db) may be clustered to obtain cluster-specific data Dc.

When a model is created by performing the clustering according to the first modification, a cluster (and accordingly a model) to which a physical quantity measured for a cutting tool to be estimated belongs may also be selected in accordance with the clustering according to the first modification. For example, a physical quantity of a cutting tool to be estimated may be measured at appropriate times as described above. The physical quantity, however, may be measured at least at sampling times at which extraction has been performed in the clustering of training data. A cluster may then be selected on the basis of measurement information at the sampling times at which the extraction has been performed. When the physical quantity is then measured for the cutting tool to be estimated, the physical quantity may be input to a model corresponding to the already selected cluster, and the amount of wear may be thus estimated.

(Second Modification of Clustering)

A mode in which clustering is performed on the basis of only measurement information regarding a physical quantity of a cutting tool has been described above. Another type of information, however, may be used for the clustering in addition to the measurement information. Information regarding a workpiece 101 at a time when each piece of element data db has been obtained, for example, may be used for the clustering. The information regarding a workpiece 101 may be information regarding components of a material of the workpiece 101 (e.g., a component ratio of some or all of the components) and physical properties of the workpiece 101. The information may be, for example, conceptualized or stored as information included in element data db.

When a model is created by performing the clustering according to the second modification, a cluster (and accordingly a model) to which a physical quantity measured for a cutting tool to be estimated belongs may also be selected in accordance with the clustering according to the second modification. For example, information regarding a workpiece may be included in addition to information regarding the physical quantity, and a cluster whose distance to a representative point or element data db is the smallest may be selected, instead.

(Estimation System)

Figure 10:
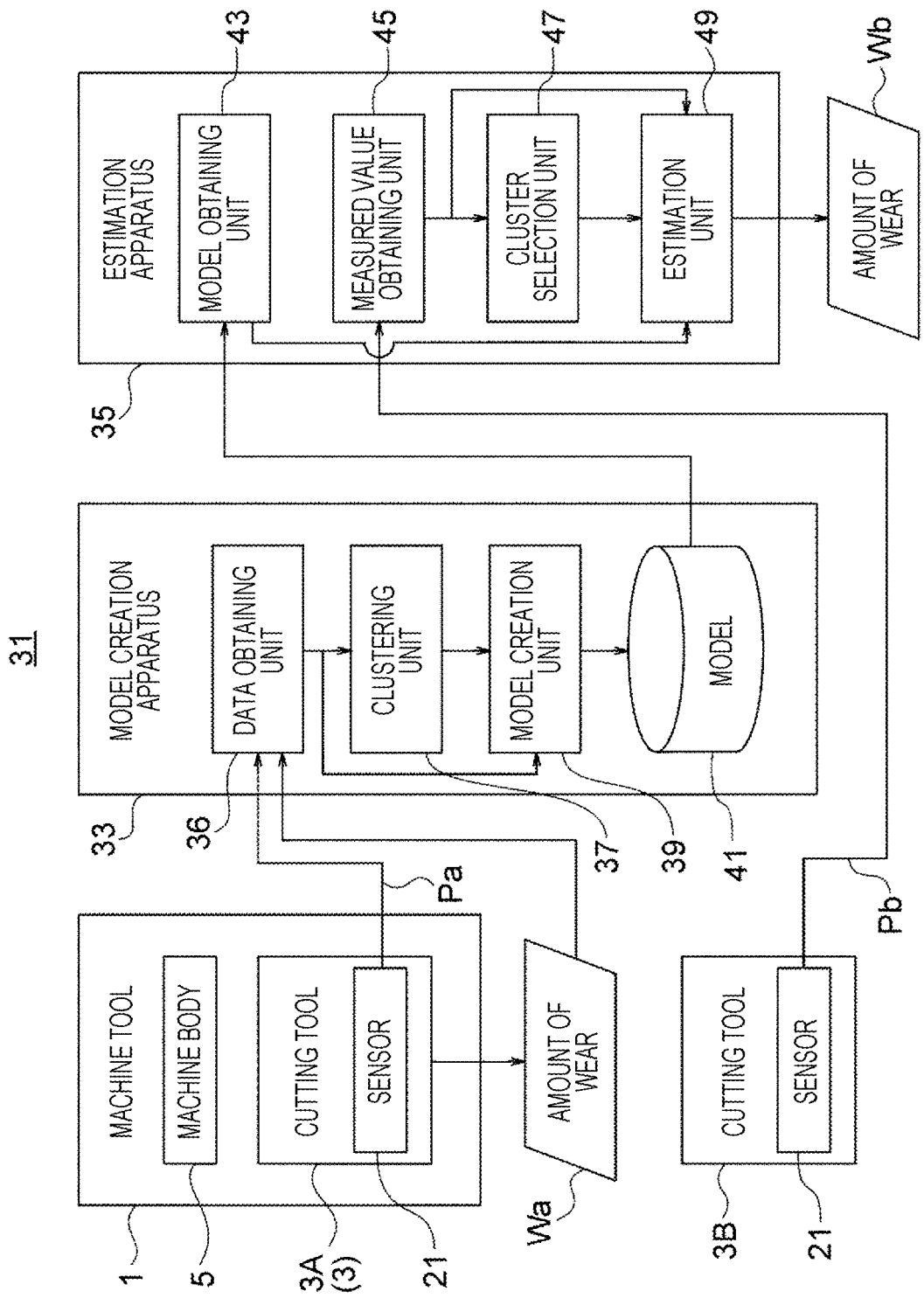
FIG. 10 is a block diagram illustrating an example of the configuration of signal processors of an estimation system according to the embodiment.

FIG. 10 may be a block diagram illustrating an example of the configuration of signal processors of an estimation system 31 that performs the above-described estimation method.

The estimation system 31 may include, for example, a machine tool 1, a model creation apparatus 33, and an estimation apparatus 35. The model creation apparatus 33 may obtain measurement information Pa regarding a physical quantity and measurement information Wa regarding the amount of wear from the machine tool 1 or the like and may create a model 41 for estimating the amount of wear. The estimation apparatus 35 may input, to the model 41 created by the model creation apparatus 33, information Pb regarding a physical quantity of a cutting tool 3B different from a cutting tool 3A used to generate training data and may obtain estimation information Wb regarding the amount of wear. In the following description, the measurement information Pa, Pb, and Wa might be given the same reference numerals regardless of whether the information has been processed.

The model creation apparatus 33 and the estimation apparatus 35 may be achieved, for example, by a computer. The computer may include, for example, a CPU (central processing unit), a RAM (random-access memory), a ROM (read-only memory), and an external storage device. The CPU may execute programs stored in the ROM and/or the external storage device to construct various functional units that perform various types of processing.

In order to facilitate understanding, the three apparatuses may be conceptualized here in accordance with a procedure of an estimation method, that is, creation of an estimation model and use of the estimation model (estimation in a narrow sense). The hardware configuration and/or programs of the estimation system 31, however, need not be divided into three apparatuses as above (may be divided). For example, two or more apparatuses may share some hardware and/or programs, or two or more apparatuses may be integrated with one another such that the two or more apparatuses can be regarded as a single apparatus. Conversely, the three apparatuses may be achieved such that the three apparatuses can be regarded as being divided into four or more apparatuses. Although the estimation system 31 is defined as including the machine tool 1 here, the estimation system 31 may be defined without the machine tool 1, instead.

As described above, the machine tool 1 may include a cutting tool 3 and a machine body 5. A physical quantity of the cutting tool 3 may be detected by the cutting tool 3 or the machine body 5 as described above. In the illustrated example, the cutting tools 3 (3A and 3B) each may include a sensor 21 for detecting a physical quantity. Information Pa or Pb regarding the physical quantity detected by the sensor 21 may be input to the model creation apparatus 33. The input may be made through, for example, wireless communication, wired communication, transportation of a storage medium to which the information Pa has been input, manual input, or a combination of two or more of these.

The one or more cutting tools 3A used to generate training data and the cutting tool 3B whose amount of wear is estimated may be cutting tools of the same. In addition, as described above, the cutting tools 3A and 3B may include the same (actually one-and-only) holder 13 in the case of a throwaway bit. The cutting tools 3A and 3B may be used by the same (actually one-and-only) machine tool 1, different machine tools 1 of the same type, or machine tools 1 of different types.

As mentioned above, the measurement information Wa regarding the amount of wear may be obtained, for example, by an appropriate measuring apparatus 51 (refer to FIG. 11) such as an image analysis apparatus. The information Wa obtained by the measuring apparatus 51 may be input to the model creation apparatus 33 through, for example, wireless communication, wired communication, transportation of a storage medium to which the information Wa has been input, manual input, a combination of two or more of these. The measuring apparatus 51 may be regarded as a part of the estimation system 31, a part of the machine tool 1, or an apparatus separate from these.

The model creation apparatus 33 may include, for example, a data obtaining unit 36, a clustering unit 37, and a model creation unit 39. The data obtaining unit 36 may obtain training data (the measurement information Pa regarding the physical quantity and the measurement information Wa regarding the amount of wear). As described with reference to FIGS. 5, 6A and 9, the clustering unit 37 may generate cluster-specific data Dc by clustering training data obtained by the data obtaining unit 36. As described with reference to FIG. 6B, the model creation unit 39 may create a model 41 (only one model 41 is illustrated here) for each cluster on the basis of the cluster-specific data Dc.

The estimation apparatus 35 may include, for example, a model obtaining unit 43, a measured value obtaining unit 45, a cluster selection unit 47, and an estimation unit 49. The model obtaining unit 43 may obtain, from the model creation apparatus 33, information regarding a result of clustering (refer to cluster determination data 57 in FIG. 11) and a model for each cluster. The measured value obtaining unit 45 may obtain measurement information Pb regarding a physical quantity from the cutting tool 3B whose amount of wear is to be estimated. The cluster selection unit 47 may select a cluster to which the information Pb regarding the physical quantity obtained by the measured value obtaining unit 45 belongs on the basis of the cluster determination data 57 obtained by the model obtaining unit 43. The estimation unit 49 may input the information Pb regarding the physical quantity obtained by the measured value obtaining unit 45 to the model 41 obtained by the model obtaining unit 43 and corresponding to the cluster selected by the cluster selection unit 47. As a result, estimation information Wb regarding the amount of wear may be obtained. The model obtaining unit 43 may obtain a plurality of models 41 corresponding to a plurality of clusters or only one model 41 on the basis of a result of selection performed by the cluster selection unit 47.

In order to facilitate understanding, the above-described functional units may be conceptualized here. That is, the data obtaining unit 36, the clustering unit 37, and the model creation unit 39 may be conceptualized in the model creation apparatus 33 in accordance with a procedure of a method for creating a model according to the present embodiment, that is, obtaining of training data, clustering, and creation of an estimation model. Since the model creation apparatus 33 and the estimation apparatus 35 are conceptualized and illustrated as separate apparatuses, the model obtaining unit 43 may be conceptualized in the estimation apparatus 35. In addition, the measured value obtaining unit 45, the cluster selection unit 47, and the estimation unit 49 may be conceptualized in accordance with a method for using an estimation model, that is, obtaining of a measured value, selection of a cluster, and inputting to an estimation model. The functional units may be actually achieved, but parts or the entirety of two or more functional units may be integrated with one another, some functional units may be omitted, or functional units more than those described above method achieved, instead.

(Another Block Diagram of Estimation System)

Figure 11:
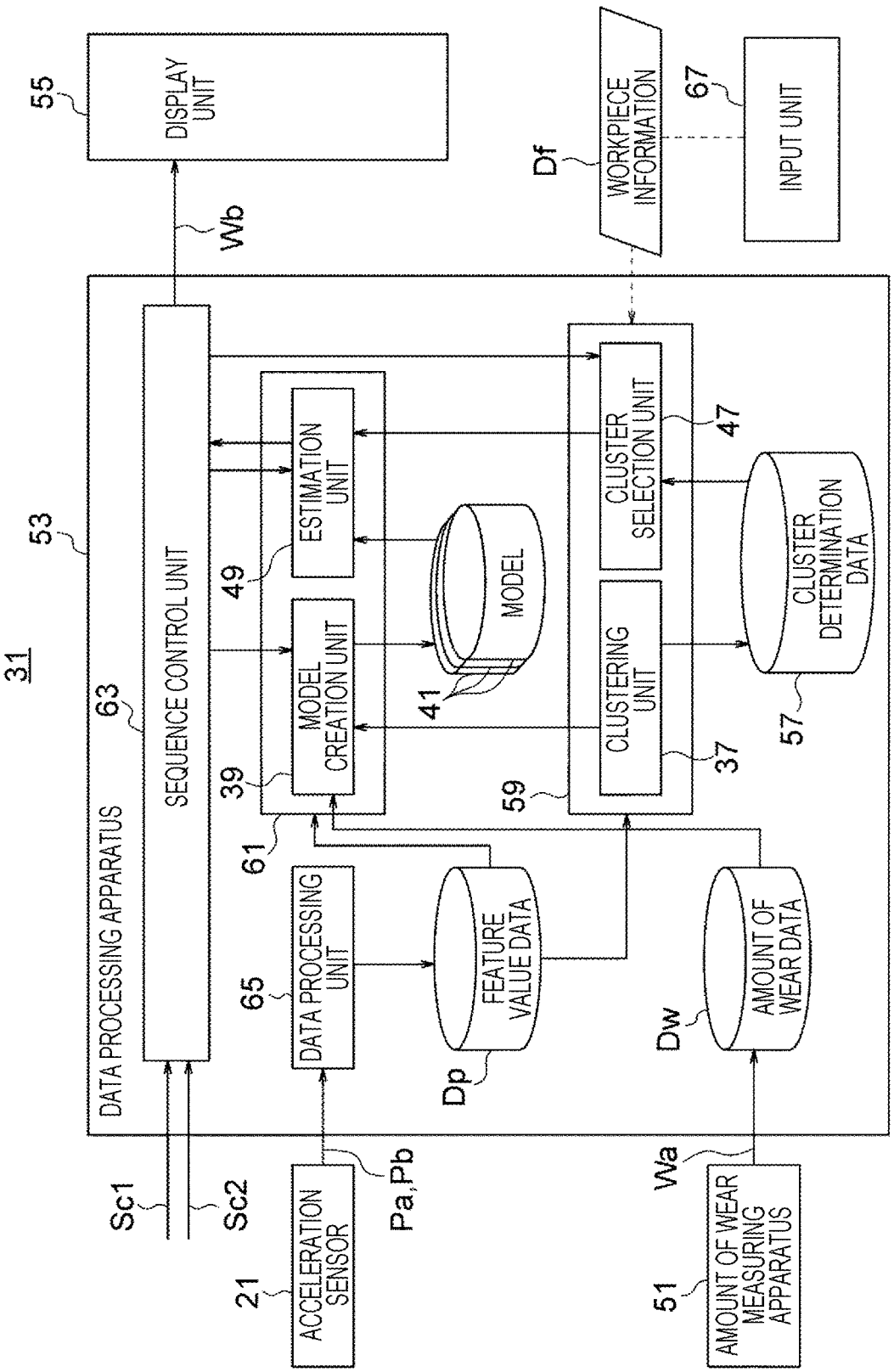
FIG. 11 is a block diagram illustrating the example of the configuration of the estimation system illustrated in FIG. 10 from another perspective.

FIG. 11 may be a block diagram illustrating an example of the configuration of the estimation system 31.

As described above, the components of the estimation system 31 illustrated in FIG. 10 may be conceptualized in accordance with the procedure of the method for estimating the amount of wear, and an actual hardware configuration and/or programs may or may not match the configuration illustrated in FIG. 10. Similarly, the configuration of the estimation system 31 illustrated in FIG. 11 may or may not match an actual hardware configuration and/or programs. From another perspective, FIG. 11 may be regarded as a diagram illustrating the configuration of the estimation system 31 from a point of view different from that in FIG. 10 or a diagram illustrating a mode different from that illustrated in FIG. 10. In the following description, however, it may be assumed for convenience that the actual hardware configuration and the programs match the configuration illustrated in FIG. 11. FIG. 11 may illustrate details of some components illustrated in FIG. 10.

The estimation system 31 may include a data processing apparatus 53. The data processing apparatus 53 may function as both the model creation apparatus 33 and the estimation apparatus 35 illustrated in FIG. 10. The data processing apparatus 53, therefore, may receive the information Pa and Pb regarding the physical quantity from the sensor 21 and the information Wa regarding the amount of wear from the measuring apparatus 51. The data processing apparatus 53 then may output the estimation information Wb regarding the amount of wear corresponding to the information Pb regarding the physical quantity. Here, a display unit 55 may be an example of a destination of the estimation information Wb.

In FIG. 11, the clustering unit 37 and the cluster selection unit 47 illustrated in FIG. 10 may be integrated with each other to achieve a cluster processing unit 59. The model creation unit 39 and the estimation unit 49 illustrated in FIG. 10 may be integrated with each other to achieve an estimation processing unit 61. A storage unit (hardware) in which the clustering unit 37 saves the cluster determination data 57 and a storage unit from which the cluster selection unit 47 reads the cluster determination data 57 may be the same. A storage unit to which the model creation unit 39 saves the models 41 and a storage unit from which the estimation unit 49 reads the models 41 may be the same. The model obtaining unit 43 illustrated in FIG. 10, therefore, may not be necessary.

The data processing apparatus 53 may include a sequence control unit 63 that controls the cluster processing unit 59 and the estimation processing unit 61. When the sequence control unit 63 receives a signal Sg1 for requesting creation of an estimation model, for example, the sequence control unit 63 may instruct the model creation unit 39 and the clustering unit 37 to create a model 41. When the sequence control unit 63 receives a signal Sg2 for requesting use of an estimation model (estimation of the amount of wear), for example, the sequence control unit 63 may instruct the cluster selection unit 47 and the estimation unit 49 to estimate the amount of wear. The signals Sg1 and Sg2 may be input, to the data processing apparatus 53, from an input unit 67 that receives user operations.

When instructed by the sequence control unit 63 to create an estimation model, the clustering unit 37 may cluster a plurality of pieces of element data db and may save cluster determination data 57 indicating a result of the clustering. The model creation unit 39 may create and may save a model 41 for each cluster on the basis of the plurality of pieces of element data db while referring to the cluster determination data 57. When instructed from the sequence control unit 63 to use an estimation model, the cluster selection unit 47 may refer to the cluster determination data 57 and may select a cluster to which information Pb regarding a physical quantity of a cutting tool to be estimated belongs. The estimation unit 49 may read a model 41 corresponding to the selected cluster, may substitute the information Pb, and may transmit a result to the sequence control unit 63.

The sensor 21 may sequentially substitute, for example, measured values of the physical quantity in order of the measurement. The sequential transmission is not limited to sequential transmission of a measured value at each sampling interval, and may include simultaneous transmission of measured values at consecutive sampling intervals grouped together. Data including a plurality of measured values grouped together may be configured such that, for example, order of the measurement of the plurality of measured values can be identified. Such transmission may be performed, for example, in order to reduce a communication load.

The estimation system 31 may include a data processing unit 65 that obtains measured values (measurement information Pa and Pb) sequentially transmitted from the sensor 21. The data processing unit 65 may correspond to the data obtaining unit 36 illustrated in FIG. 10. The data processing unit 65 may generate the time-series data De (or the period-specific time-series data Des) illustrated in FIG. 7A by accumulating (storing in the storage unit) the measured values sequentially transmitted from the sensor 21. Alternatively, the sensor 21 may sequentially transmit the period-specific time-series data Des to the data processing unit 65.

As described with reference to FIGS. 7A and 7B, the data processing unit 65 may identify feature values (e.g., statistical values and/or parameters of a spectrum) of a physical quantity on the basis of the time-series data De. That is, the data processing unit 65 may generate, for example, information (feature value data Dp) regarding the physical quantity included in element data db illustrated in FIGS. 4A and 4B or the like (i.e., another data including a plurality of pieces of element data db). The feature value data Dp may be used by the clustering unit 37 and the model creation unit 39.

The amount of wear measured by the measuring apparatus 51 may be stored by the data obtaining unit 36, which is not illustrated, as amount of wear data Dw here. The amount of wear data Dw may be used by the model creation unit 39. The element data db may be achieved by the feature value data Dp and the amount of wear data Dw.

As described above, workpiece information Df may be used in clustering of training data and selection of a cluster when an estimation model is used. The workpiece information Df may be input, for example, to the data processing apparatus 53 by the input unit 67, which receives user operations.

The display unit 55 may have an appropriate configuration and be, for example, a liquid crystal display or an organic EL display capable of displaying images. The display unit 55 may display a certain image on the basis of estimation information Wb regarding the amount of wear input from the data processing apparatus 53. The image may include text and/or figures indicating content of the information Wb. The input unit 67, too, may have an appropriate configuration and be, for example, a computer keyboard. The display unit 55 and the input unit 67 may be regarded as a part of the estimation system 31 or devices separate from the estimation system 31.

(Sensor of Cutting Tool and Communication Unit)

When a sensor 21 is provided for a cutting tool, the sensor 21 may be provided for a shank (holder 13) or an edge part (e.g., an insert 15). A specific position of the sensor at a time when the sensor 21 is provided for the shank may be appropriately set. In the cutting tool 3 illustrated in FIG. 2, for example, the sensor 21 may be located closer to the second end 3b than a part (top) in which the insert 15 and the clamp 16 are located or may be located at the top. Alternatively, the sensor may be incorporated into the cutting tool or attached to the cutting tool. An example of the cutting tool 3 provided with the sensor 21 will be described hereinafter.

As illustrated in FIG. 2, for example, the holder 13 may include a holding body 19 that contributes to holding of the insert 15 and attachment to and removal from the turret 9. The holder 13 may also include various elements that contribute to giving multiple may function to the cutting tool 3. For example, the holder 13 may include the sensor 21 and a communication unit 23. The sensor 21 detects the above-described physical quantity. The communication unit 23 may wirelessly substitute, for example, information regarding the physical quantity detected by the sensor 21.

Although not particularly illustrated, power consumed by the sensor 21 and the communication unit 23 may be supplied from a battery included in the holder 13 or supplied from the outside of the cutting tool 3 (e.g., the machine body 5) wirelessly or by wire. The information regarding the physical quantity detected by the sensor 21 may be, as described above, output to the outside of the cutting tool 3 by wire. In other words, the communication unit 23 may be omitted or configured to be connectable to wire.

An outer shape of the holding body 19 may be as described above. The holding body 19 may include, for example, a body 19a in which a recess 19r is formed and a cover 19b for covering the recess 19r. The recess 19r may store the sensor 21 and the communication unit 23. A position, a shape, and dimensions of the recess 19r may be determined as desired. The recess 19r need not be provided with the cover 19b and may be filled with a resin to seal the sensor 21 and the communication unit 23.

(Sensor)

The sensor 21 may include only a transducer that converts a physical quantity into an electrical signal (may be a sensor in a narrow sense) or include an amplifier or the like in addition to the transducer. The sensor 21 may also include, for example, a microcomputer capable of performing various types of processing on a measured physical quantity. The various types of processing may include, for example, a process for calculating feature values from time-series data regarding measured values of a physical quantity. In other words, a part or the entirety of the above-described data processing unit 65 may be provided for not the data processing apparatus 53 but the cutting tool 3. A shape and dimensions of the sensor 21 may be determined as desired.

FIG. 2 may illustrate only one sensor 21. Two or more sensors, however, may be provided, instead. In this case, the two or more sensors may detect different physical quantities (e.g., acceleration and temperature) or the same physical quantity. In the latter case, acceleration in different directions, for example, may be detected. Acceleration in different directions, however, may be regarded as different physical quantities, instead.

When the sensor 21 is an acceleration sensor, the sensor 21 may detect acceleration in one axis direction, two axis directions (usually two axes perpendicular to each other), or three axis directions (usually three axes perpendicular to one another). For example, the sensor 21 may be configured as a three-axis accelerometer capable of detecting acceleration along the B1 axis, the B2 axis, and the B3 axis.

When a sensor is provided in such a way as to detect acceleration in three axis directions, two or more sensors capable of detecting one-axis or two-axis acceleration may be arranged in different directions, unlike in the illustrated example. The same may hold when acceleration in two axis directions is detected. Axes along which the sensor detects acceleration may be parallel to or inclined from the B1 axis, the B2 axis, and/or the B3 axis. In the latter case, too, acceleration along the B1 axis, the B2 axis, and/or the B3 axis can be identified using a trigonometric function.

(Communication Unit)

The communication unit 23 may be connected to the sensor 21 by wire, and information regarding a physical quantity measured by the sensor 21 may be transmitted to the communication unit 23. The information transmitted to the communication unit 23 may be wirelessly transmitted to the outside of the cutting tool 3 from the communication unit 23.

A connection unit 25 that connects the sensor 21 and the communication unit 23 to each other by wire may be, for example, wiring using a conductor or a circuit. Transmission of information from the sensor 21 to the communication unit 23 is not limited to above, and may be achieved, for example, using optical wiring.

The wireless communication performed by the communication unit 23 may be, for example, achieved using radio waves. In this case, the communication unit 23 may modulate an electrical signal from the sensor 21 (or an electrical signal based on an optical signal or the like from the sensor 21) and may increase a frequency (conversion into a high-frequency signal having a carrier frequency) of the electrical signal, for example, and then may convert the high-frequency signal into radio waves using an antenna and may transmit the radio waves. The wireless communication is not limited to above, and may be, for example, achieved using light, instead.

A range over which a wireless signal transmitted from the communication unit 23 can reach (a range within which the communication unit 23 directly performs wireless communication) may be narrow or wide. For example, the range may cover a machine tool, a factory (building), a site in which a plurality of factories exist, an area such as a municipality, or a wider area.

(Example of Business Model)

As described above, the hardware configuration of the estimation system 31 and the like may or may not match that illustrated in FIG. 10 or 11. The above-described various functional units, therefore, may be achieved by the same hardware or different pieces of hardware. Distances between the different pieces of hardware may be determined as desired. From another perspective, communication between the different pieces of hardware may be wired communication, wireless communication, communication over a communication network (e.g., a public communication network), and communication without a communication network. The communication network may be, for example, the Internet and/or a telephone network. Integration and distribution of such a hardware configuration may be appropriately performed, for example, in accordance with a business model or the like relating to the method for estimating the amount of wear. Some modes of the business model or the like will be described hereinafter.

For example, a processor who performs cutting using the cutting tool 3B may transmit measurement information Pb regarding a physical quantity of the cutting tool 3B to an estimator who estimates the amount of wear, and the estimator may transmit estimation information Wb regarding the amount of wear according to the measurement information Pb to the processor. In this case, for example, the processor may own the machine tool 1 including the cutting tool 3B, and the estimator may own the model creation apparatus 33 and the estimation apparatus 35. From another perspective, the model creation apparatus 33 and the estimation apparatus 35 may be integrated together as the data processing apparatus 53 as illustrated in FIG. 11. In addition, the data processing apparatus 53 may be provided at a position distant from the machine tool 1 owned by the processor, obtain the measurement information Pb over a communication network, and transmit the estimation information Wb to the machine tool 1 over the communication network.

Alternatively, for example, a model creator who creates an estimation model may provide, through communication or a storage medium, a model 41 for a model user who uses the estimation model to estimate the amount of wear. The model user may be, for example, a processor who performs cutting using the cutting tool 3B. In this case, for example, the processor may own the machine tool 1 including the cutting tool 3B and the estimation apparatus 35, and the model creator may own the model creation apparatus 33. From another perspective, the machine tool 1 and the estimation apparatus 35 may be integrated with each other. The model creation apparatus 33 may be provided at a position distant from the machine tool 1 and the estimation apparatus 35 owned by the processor. From yet another perspective, the machine tool 1 and the estimation apparatus 35 need not communicate information with each other over the communication network. It may be needless to say that a location at which a model is used may be provided separately from a location (e.g., a factory) at which cutting is performed, and information may be communicated over the communication network.

In a mode in which a model creator provides a model 41 for a model user as in the above description, for example, the model user need not be a processor who performs cutting using the cutting tool 3B. In other words, the processor may transmit, to the model user, measurement information Pb regarding a physical quantity of the cutting tool 3B, and the model user may transmit, to the processor, estimation information Wb regarding the amount of wear according to the measurement information Pb. In this case, for example, the processor may own the machine tool 1 including the cutting tool 3B, the model creator may own the model creation apparatus 33, and the model user may own the estimation apparatus 35. From another perspective, the machine tool 1, the model creation apparatus 33, and the estimation apparatus 35 may be provided at positions distant from one another and may communicate information with one another over the communication network.

Alternatively, for example, the processor who performs cutting using the cutting tool 3B may create and use a model. In this case, for example, the processor may own the machine tool 1 (i.e., the cutting tools 3A and 3B), the model creation apparatus 33, and the estimation apparatus 35. From another perspective, at least two of the machine tool 1, the model creation apparatus 33, and the estimation apparatus 35 may be integrated with each other. From yet another perspective, information need not be communicated over the communication network. It may be needless to say that a location at which a model is created and used may be provided separately from a location (e.g., a factory) at which cutting is performed, and information may be communicated over the communication network.

The communication between the model creator or the model user and the processor who performs cutting using the cutting tool 3B over the communication network may be, for example, communication between the model creation apparatus 33 or the estimation apparatus 35 and a communication device included in the machine tool 1 over the communication network. The communication with the processor over the communication network may include, for example, communication with a communication device provided near the machine tool 1 over the communication network. For example, the communication device may communicate with the machine tool 1 without using the communication network or need not communicate with the machine tool 1. The communication device, however, may be regarded as a part of the machine tool 1 (machine body 5). In the description of the present disclosure, such a communication device may be assumed to be a part of a machine tool for convenience unless otherwise noted. Although estimation information Wb regarding the amount of wear may be transmitted to the machine tool 1 in the above description, for example, the transmission may be transmission to the communication device near the machine tool.

The estimator who creates and uses an estimation model and the model creator who creates an estimation model (except for the processor who performs cutting using the cutting tool 3B) may, for example, obtain training data using the machine tool 1 including the cutting tool 3A owned thereby when creating an estimation model. From another perspective, the machine tool 1 including the cutting tool 3A may be integrated with the model creation apparatus 33. In addition, or alternatively, the estimator and the model creator may, for example, obtain training data from a processor who owns the cutting tools 3A and 3B or a processor who owns only the cutting tool 3A (a processor different from the processor who owns the cutting tool 3B). From another perspective, the model creation apparatus 33 may communicate with the machine tool 1 including the cutting tool 3A over the communication network.

In the present embodiment, the time-series data De regarding the physical quantity illustrated in FIG. 7A may not be used to create and use a model, but the feature value data Dp calculated on the basis of the time-series data De (more strictly, the period-specific time-series data Des) may be used. A processor who uses the cutting tools 3A and/or 3B, for example, therefore, may transmit only the feature value data Dp without transmitting the time-series data De. The data processing unit 65, therefore, may be included in the machine tool 1 owned by the processor. More specifically, the data processing unit 65 may be included in the cutting tool 3 or the machine body 5 (including the nearby communication device). As a result, a load of the communication network may be reduced.

In the above business model, estimation information (estimated value) regarding the amount of wear may be provided for the processor. Other information based on estimated values of the amount of wear, however, may be provided in addition to, or instead of, the estimated values of the amount of wear. Whether an end of life of a cutting tool to be estimated has come may be determined on the basis of estimated values of the amount of wear, for example, and information regarding a result of the determination may be provided for the processor. The information based on estimated values of the amount of wear, however, may be regarded as estimation information regarding the amount of wear. In the description of the present disclosure, estimation information regarding the amount of wear might include information based on estimated values of the amount of wear.

(Flowchart)

An example of a flowchart illustrating a procedure of a process for achieving an operation of the estimation system 31 will be described hereinafter. The following flowchart may be shown such that the procedure of the process can be easily understood conceptually, and may not necessarily accurately reflect an actual procedure.

(Overall Process)

Figure 12:
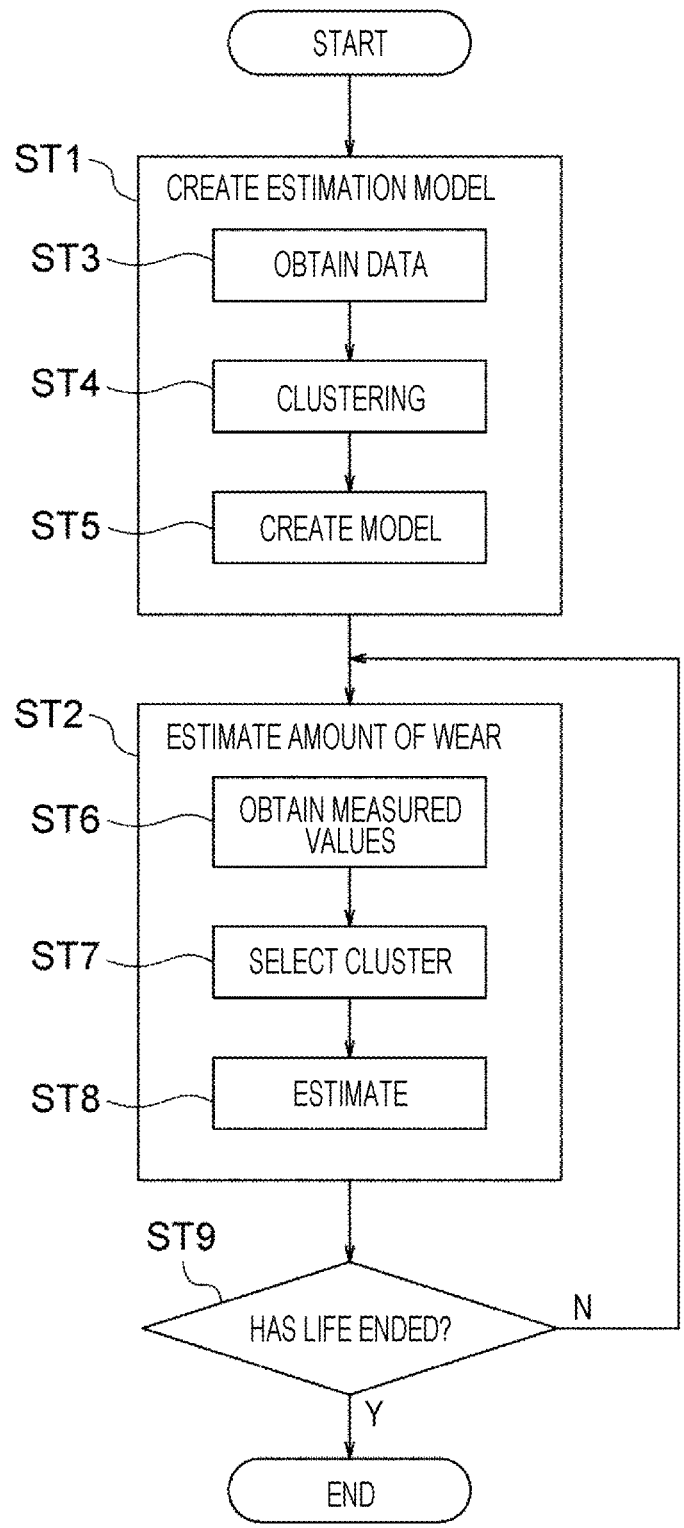
FIG. 12 is a flowchart illustrating a procedure of an overall process performed by the estimation system illustrated in FIG. 10 to obtain training data and estimate the amount of wear.

FIG. 12 may be a flowchart illustrating a procedure of an overall process performed by the estimation system 31 to obtain training data and estimate the amount of wear.

In step ST1, the estimation system 31 (model creation apparatus 33) may create a model 41 for obtaining training data and estimating the amount of wear. This process may begin, for example, when a signal Sg1 is input as a result of an operation performed on the input unit 67. Step ST1 may include, for example, steps ST3 to ST5.

In step ST2, the estimation system 31 (estimation apparatus 35) may estimate the amount of wear using the model 41 created in step ST1. This processing may begin, for example, when a signal Sg2 is input as a result of an operation performed on the input unit 67. Step ST2 may include, for example, steps ST6 to ST8.

In step ST9, the estimation system 31 (e.g., the estimation apparatus 35; or an apparatus other than the estimation system 31) may determine whether an estimated value of the amount of wear obtained in step ST2 exceeds a certain threshold to determine whether an end of life of the cutting tool 3B (FIG. 10) to be estimated has come. If determining that the end of life has not come, the estimation system 31 may repeat step ST2 at certain intervals. If determining that the end of life has come, the estimation system 31 may perform processing or the like for notifying of the fact, and the illustrated process end.

The model 41 may be used to estimate the amount of wear of a plurality of cutting tools 3B. When the amount of wear of a next cutting tool 3B is estimated after it is determined in step ST9 that the end of life has come and the process ends, therefore, step ST1 may be skipped.

Here, step ST2 may be automatically repeated until the end of life come. Such automatic repetition, however, need not be performed. For example, as mentioned above, since step ST2 is performed in accordance with an operation performed on the input unit 67, step ST2 may be performed at any time when the user desires to know the amount of wear. In this case, the determination as to an end of life (i.e., the processing for notifying of information regarding an end of life instead of, or in addition to, information regarding an estimated value of the amount of wear) may or may not be made.

In step ST3, the estimation system 31 (data obtaining unit 36) may obtain training data. This process may be, for example, a process for obtaining first accumulation data Da (FIG. 4A). In order to generate the first accumulation data Da, for example, processing for generating time-series data De (FIG. 7A) by accumulating measured values of a physical quantity sequentially transmitted from the sensor 21, processing for generating feature value data Dp (FIG. 11) from time-series data De, and processing for generating the first accumulation data Da by integrating the feature value data Dp and amount of wear data Dw (FIG. 11) with each other may be performed. Step ST3 may be conceptualized, for example, in such a way as to include all the processing, only part of the processing, or none of the processing and include only processing for reading complete first accumulation data Da.

In step ST4, the estimation system 31 (clustering unit 37) may cluster a plurality of element data db (more specifically, information regarding the physical quantity) included in the training data (first accumulation data Da) obtained in step ST3. As a result, a plurality of pieces of cluster-specific data Dc (FIG. 6A), each of which includes a plurality of (or one, which is theoretically possible) pieces of element data db similar to one another, may be obtained.

In step ST5, the estimation system 31 (model creation unit 39) may create an estimation model 41 for each cluster on the basis of the plurality of pieces of element data db included in each of the pieces of cluster-specific data Dc obtained in step ST4.

In step ST6, the estimation system 31 (measured value obtaining unit 45) may obtain measurement information Pb (FIG. 10) regarding the physical quantity of the cutting tool 3B to be estimated. This process may be, for example, a process for obtaining measurement information Pb processed in such a way as to be applicable to the model 41 (and a cluster is selectable). In order to obtain measurement information Pb applicable to the model 41, for example, processing for generating time-series data De (FIG. 7A) by accumulating measured values of the physical quantity sequentially transmitted from the sensor 21 and processing for generating feature value data Dp (FIG. 11) from the time-series data De may be performed. Step ST6 may be conceptualized, for example, in such a way as to include all the processing, only part of the processing, or none of the processing and include only processing for reading complete feature value data Dp.

In step ST7, the estimation system 31 (cluster selection unit 47) may select, among the plurality of clusters obtained in step ST4, a cluster to which the measurement information Pb regarding the physical quantity obtained in step ST6 belongs.

In step ST8, the estimation system 31 (estimation unit 49) may input the measurement information Pb regarding the physical quantity obtained in step ST6 to a model 41 corresponding to the cluster selected in step ST7. As a result, estimation information Wb (FIG. 10) regarding the amount of wear may be obtained. The estimation system 31 may perform processing for notifying of the estimation information Wb in step ST8 or each time step ST8 has been performed a certain number of times.

(Process Relating to Obtaining of Training Data)

Figure 13:
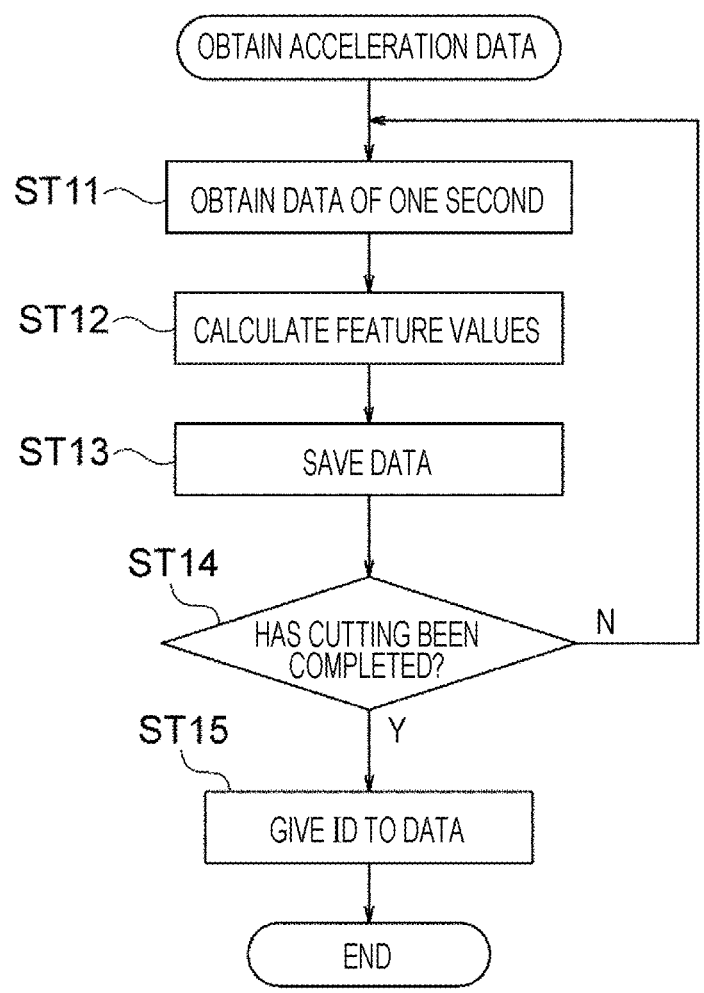
FIG. 13 is a flowchart illustrating an example of a procedure of a process for obtaining acceleration data in step ST3 in FIG. 12.

FIG. 13 may be a flowchart illustrating an example of a procedure of a process for obtaining acceleration data performed by the estimation system 31 (data obtaining unit 36) in step ST3 in FIG. 12.

In the illustrated example, the process in step ST3 may be conceptualized in such a way as to include processing for sequentially obtaining measured values from the sensor 21. In FIG. 13 and an example illustrated in FIG. 14, which will be described later, a mode may be assumed in which, as described with reference to FIG. 8, measured values of the amount of wear are interpolated. In the process illustrated in FIG. 13, therefore, the amount of wear need not be measured each time information regarding the physical quantity included in element data db is obtained. In other words, the machine tool 1 need not be stopped each time information regarding the physical quantity included in element data db is obtained.

FIG. 13 may illustrate, in the process in step ST3, for example, processing for obtaining data regarding one of one or more cutting tools 3A for training data. The illustrated processing may be regarded as, for example, processing that begins when each cycle starts and that is performed to obtain data in the cycle, processing that beings when a first one of a plurality of cycles starts and that is performed to obtain data over the plurality of cycles, or processing that begins when a certain one of a plurality of cutting operations starts in each cycle and that is performed to obtain data regarding the certain cutting operation.

In step ST11, the estimation system 31 may receive measured values of the physical quantity sequentially transmitted from the sensor 21 and may generate time-series data of a certain length of time (e.g., one second). The time-series data may be used as period-specific time-series data Des (FIG. 7A), or period-specific time-series data Des may be generated by extracting part of the time-series data.

In step ST12, the estimation system 31 (data processing unit 65) may calculate one or more feature values on the basis of the period-specific time-series data Des obtained in step ST11.

In step ST13, the estimation system 31 (data processing unit 65) may save the one or more feature values calculated in step ST12 in the storage unit as feature value data Dp (FIG. 11). The feature value data Dp at this time may, for example, include information with which a sampling time (t1 in FIG. 3B etc.) corresponding to the one or more feature values can be identified or be saved in a structure with which the sampling time corresponding to the one or more feature values can be identified.

In step ST14, the estimation system 31 may determine whether cutting (e.g., cutting in one cycle, cutting over a plurality of cycles, or a certain type of cutting in each cycle) for which data is to be obtained has been completed. If a result is positive, the estimation system 31 may cause the process to proceed to step ST15, and if the result is negative, the estimation system 31 may cause the process to return to step ST11. When the process returns to step ST11, the plurality of pieces of feature value data Dp may be saved for cutting for which data is to be obtained.

In step ST15, the estimation system 31 may give an ID (identifier) to the one or more pieces of feature value data Dp saved in step ST13. The ID may be, for example, information given to each cutting tool 3A. When a plurality of pieces of feature value data Dp are saved as a result of the negative result of step ST14, the same ID may be given to the plurality of pieces of feature value data Dp. A specific value of the ID may be determined by the estimation system 31 in accordance with a certain algorithm or through an operation performed by the user on the input unit 67.

Figure 14:
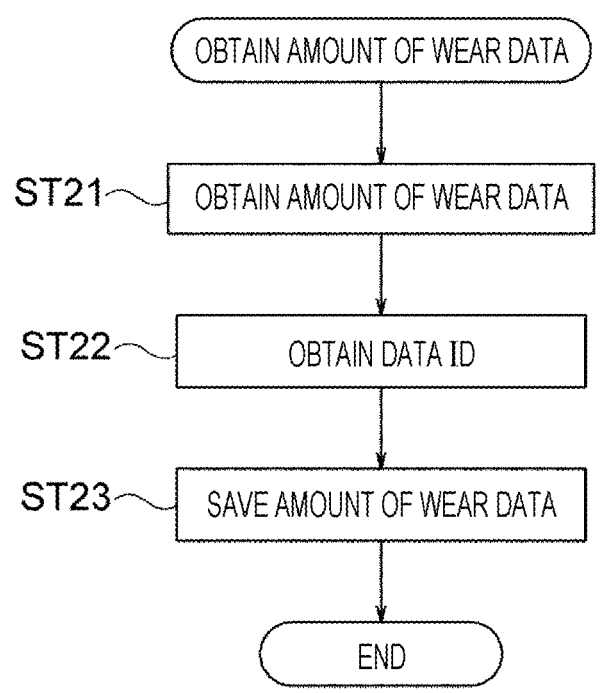
FIG. 14 is a flowchart illustrating an example of a procedure of a process for saving amount of wear data in step ST3 in FIG. 12.

FIG. 14 may be a flowchart illustrating an example of a procedure of a process for saving amount of wear data performed by the estimation system 31 (data obtaining unit 36) in step ST3 in FIG. 12.

As described above, a mode may be assumed in the example illustrated in FIG. 14 that measured values of the amount of wear are interpolated as described with reference to FIG. 8. The illustrated process, therefore, may be performed while stopping the machine tool 1 after processing corresponding to certain sampling times (e.g., t1 and t4 in FIG. 8) is performed. As described above, such a sampling time may come when, for example, the cutting tool 3A completes one (may be a last one) of a plurality of cutting operations in one cycle performed on a workpiece 101 at a certain position in order of cutting.

In step ST21, the estimation system 31 may obtain measurement information Wa regarding the amount of wear. For example, the data obtaining unit 36 may obtain the measurement information Wa regarding the amount of wear from the measuring apparatus 51. Step ST21 may be conceptualized in such a way as to include processing for measuring the amount of wear performed by the measuring apparatus 51.

In step ST22, the estimation system 31 may obtain an ID corresponding to the measurement information Wa regarding the amount of wear obtained in step ST21. For example, the estimation system 31 may obtain an ID given to one or more pieces of feature value data Dp in step ST15 in the process illustrated in FIG. 13 performed immediately before the process illustrated in FIG. 14, which is currently being performed, begins. As a result, the feature value data Dp and the measurement information Wa regarding the amount of wear relating to the same cutting tool 3A can be associated with each other.

As described above, a plurality of pieces of feature value data Dp (measurement information Pa) may be held such that a sampling time at which each of the plurality of pieces of feature value data Dp has been obtained can be identified. The measurement information Wa regarding the amount of wear, therefore, can be associated with, among the plurality of pieces of feature value data Dp regarding the same cutting tool 3A, a piece of feature value data Dp obtained at a certain sampling time. The same may hold for the amount of wear obtained as a result of interpolation.

In step ST23, the estimation system 31 may save the measurement information Wa regarding the amount of wear obtained in step ST21 in the storage unit as amount of wear data Dw (FIG. 11). At this time, for example, the ID obtained in step ST22 may be given to the amount of wear data Dw.

As understood from the above description, in the training data, the measurement information Pa regarding the physical quantity and the measurement information Wa regarding the amount of wear may be indirectly associated with each other through IDs. That may be, the measurement information Pa regarding the physical quantity and the measurement information Wa regarding the amount of wear need not be directly associated with each other as imagined from the tables illustrated in FIG. 4A. In other words, the first accumulation data Da may be distributed in terms of data structure. The same may hold for other data (e.g., the cluster-specific data Dc).

(Process Relating to Creation of Estimation Model for Each Cluster)

Figure 15:
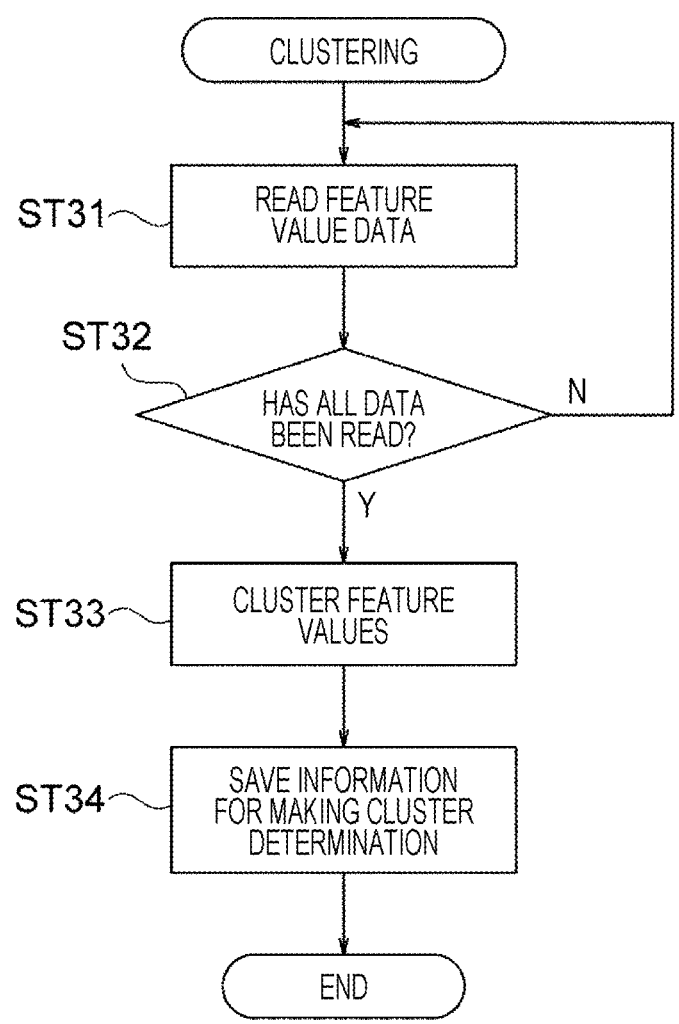
FIG. 15 is a flowchart illustrating an example of a procedure of clustering in step ST4 in FIG. 12.

FIG. 15 may be a flowchart illustrating an example of a procedure of clustering performed by the estimation system 31 (clustering unit 37) in step ST4 in FIG. 12.

In step ST31, the estimation system 31 may read feature value data Dp corresponding to one sampling time (i.e., one pieces of element data db). The feature value data Dp has been saved by performing the process illustrated in FIG. 13 one or more times.

In step ST32, the estimation system 31 may determine whether all the pieces of feature value data Dp have been read. If a result is positive, the estimation system 31 may cause the process to proceed to step ST33, and if a result is negative, the estimation system 31 may cause the process to return to step ST31.

In step ST33, the estimation system 31 may cluster the feature value data Dp read in step ST32.

In step ST34, the estimation system 31 may save information regarding a result of the clustering performed in step ST33 in the storage unit. As a result, cluster determination data 57, for example, may be generated.

More specifically, for example, the estimation system 31 may save information indicating which piece of the feature value data Dp belongs to which cluster. This may correspond to the generation of cluster-specific data Dc. As has already been mentioned, the cluster-specific data Dc need not have a data structure imagined from the tables illustrated in FIG. 6A. The estimation system 31 may save, in the storage unit, information necessary to select a cluster in step ST7 in FIG. 12. The information may be, for example, coordinates of a representative point Pr (FIG. 5) of each cluster. The cluster-specific data Dc may also serve as information necessary to select a cluster, instead.

Figure 16:
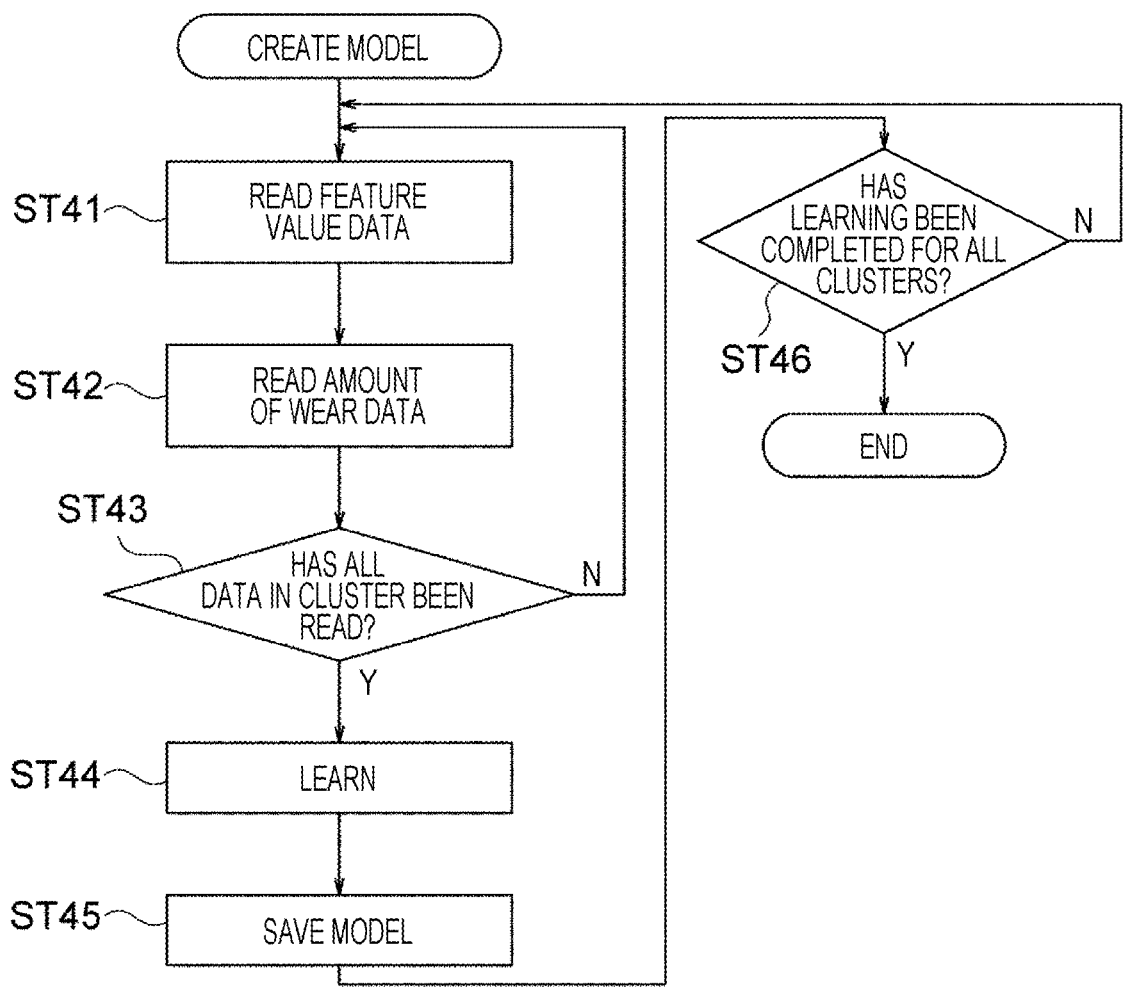
FIG. 16 is a flowchart illustrating an example of a procedure of a process for creating a model in step ST5 in FIG. 12.

FIG. 16 may be a flowchart illustrating an example of a procedure of a process for creating a model performed by the estimation system 31 (model creation unit 39) in step ST5 in FIG. 12.

Prior to step ST41, the estimation system 31 may refer to the cluster determination data 57 and may specify one of the plurality of clusters obtained in the process illustrated in FIG. 15. In step ST41, the estimation system 31 may read a piece of feature value data Dp (i.e., measurement information regarding the physical quantity held by one piece of element data db) belonging to the specified cluster.

In step ST42, the estimation system 31 may read a piece of amount of wear data Dw (i.e., measurement information regarding the amount of wear held by one piece of element data db) directly, or indirectly through an ID, associated with the piece of feature value data Dp read in step ST41. Although it is assumed here that the amount of wear data Dw is interpolated (FIG. 8) before the process illustrated in FIG. 16, the amount of wear data Dw may be interpolated in step ST42, instead.

In step ST43, the estimation system 31 may determine whether all the feature value data Dp and the amount of wear data Dw belonging to the currently specified cluster have been read. If a result is positive, the estimation system 31 may cause the process to proceed to step ST44, and if a result is negative, the estimation system 31 may cause the process to return to step ST41.

In step ST44, the estimation system 31 may create an estimation model 41 on the basis of a plurality of pieces of element data db (the feature value data Dp and the amount of wear data Dw) read in the processing in steps ST41 to ST43.

In step ST45, the estimation system 31 may store the estimation model 41 created in step ST44 in the storage unit. At this time, information for identifying the cluster corresponding to the model 41 may also be saved.

In step ST46, the estimation system 31 may determine whether an estimation model 41 has been created for all the clusters. If a result is positive, the estimation system 31 may end the process illustrated in FIG. 16. If a result is negative, the estimation system 31 may specify a cluster for which a model 41 has not been created and may cause the process to return to step ST41, and then may perform the processing in steps ST41 to ST45 for the newly specified cluster.

(Process for Using Estimation Model)

Figure 17:
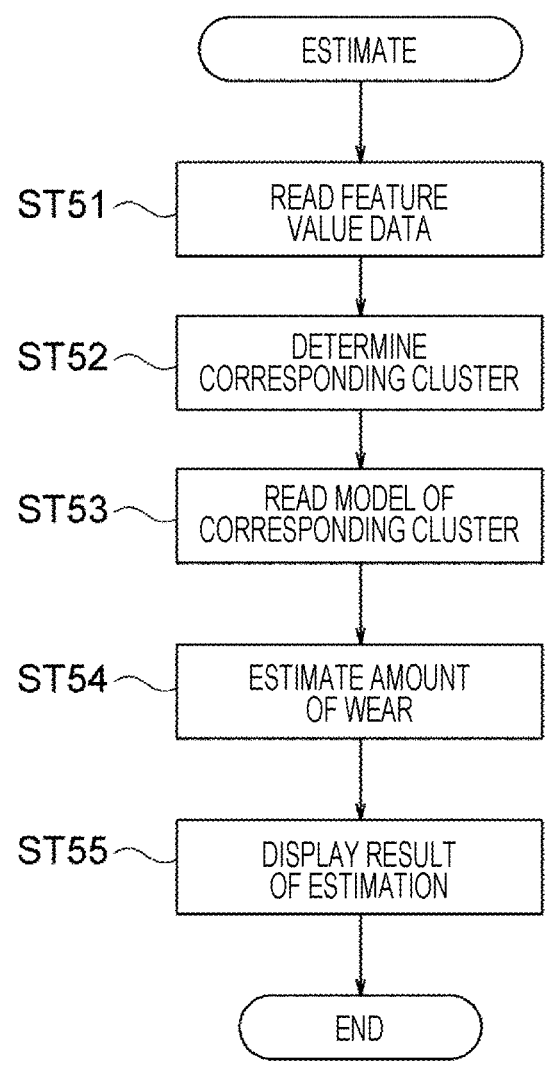
FIG. 17 is a flowchart illustrating an example of a procedure of an estimation process in step ST2 in FIG. 12.

FIG. 17 may be a flowchart illustrating an example of a procedure of an estimation process performed by the estimation system 31 (estimation apparatus 35) in step ST2 in FIG. 12.

Step ST51 may be processing corresponding to step ST6 in FIG. 12. Here, as the processing in step ST6, only the processing for obtaining feature value data Dp regarding a cutting tool 3B to be estimated may be illustrated. That is, step ST51 may be conceptualized without including the process for measuring the physical quantity of the cutting tool 3B and the like. The process for obtaining time-series data De (or period-specific time-series data Des) regarding the cutting tool 3B to be estimated may be, for example, the same as steps ST11 to ST13 in FIG. 13.

Step ST52 may be processing corresponding to step ST7 in FIG. 12. Step ST53 may be processing corresponding to a part of step ST7 and/or ST8 in FIG. 12. The estimation system 31 may read, from the storage unit, a model 41 corresponding to the cluster selected in step ST52. Step ST54 may be processing corresponding to ST8 in FIG. 12.

In step ST55, the estimation system 31 may perform processing for displaying information regarding the amount of wear obtained in step ST54 on the display unit 55.

As described above, a method for creating an amount of wear estimation model according to the present embodiment may include a data obtaining step (ST3), a clustering step (ST4), and a model creation step (ST5). From another perspective, the amount of wear estimation model creation apparatus 33 according to the present embodiment may include the data obtaining unit 36, the clustering unit 37, and the model creation unit 39. In the data obtaining step, the data obtaining unit 36 may obtain data (e.g., element data db) including measurement information Wa regarding the amount of wear of a cutting tool 3A and measurement information Pa regarding a physical quantity of the cutting tool 3A during cutting, which correlates with the amount of wear, for at least one cutting tool 3A at a plurality of sampling times (t1 and the like). In the clustering step, the clustering unit 37 may cluster a plurality of pieces of obtained element data db on the basis of the measurement information Pa regarding the physical quantity included in each piece of the data. In the model creation step, the model creation unit 39 may create, for each cluster, a model 41 for obtaining estimation information Wb regarding the amount of wear from new measurement information Pb regarding the physical quantity on the basis of the measurement information Pa regarding the physical quantity and the measurement information Wa regarding the amount of wear included in the element data db.

In addition, a method for estimating an amount of wear (a method for using an estimation model 41) according to the present embodiment may be a method for estimating an amount of wear using a model created by the method for creating an amount of wear estimation model. The method may include a measurement information obtaining step (ST6), a cluster selection step (ST7), and an estimation step (ST8). From another perspective, the amount of wear estimation apparatus 35 according to the present embodiment may be an apparatus that estimates the amount of wear using a model 41 created by the amount of wear estimation model creation apparatus 33. The amount of wear estimation apparatus 35 may include a measurement information obtaining unit (measured value obtaining unit 45), the cluster selection unit 47, and the estimation unit 49. In the measurement information obtaining step, the measured value obtaining unit 45 may obtain measurement information Pb regarding a physical quantity of a cutting tool 3B different from a cutting tool 3A used to create the model 41. In the cluster selection step, the cluster selection unit 47 may select, among a plurality of clusters, a cluster into which the measurement information Pb regarding the physical quantity obtained in the measurement information obtaining step (measured value obtaining unit 45) is classified. In the estimation step, the estimation unit 49 may apply the measurement information Pb regarding the physical quantity obtained in the measurement information obtaining step (measured value obtaining unit 45) to the model 41 corresponding to the selected cluster and may obtain estimation information Wb regarding the amount of wear (e.g., information regarding an estimated value and/or a result of a determination as to an end of life based on the estimated value).

As a result, for example, accuracy of estimating the amount of wear can be improved. Further details, for example, may be as follows.

As in the comparative example described with reference to FIG. 4B, sufficient estimation accuracy might not be achieved when all element data db is used. This is because accuracy of estimated values of the amount of wear is low even if a model is created using only a plurality of pieces of element data db whose processing conditions (composition of workpieces 101, speed of the spindle 7, feed speed of the cutting tool 3A, etc.) are the same and measurement information Pb regarding the physical quantity of a cutting tool 3B to be estimated is obtained under the same processing conditions.

As a result of the inventors' diligent study, however, it has been found that estimation accuracy improves when, as in the present embodiment, a model is created by clustering a plurality of pieces of obtained element data db. Although not particularly illustrated, experiments have confirmed the improvement in accuracy through clustering. A reason why the accuracy may improve through clustering may be supposedly as follows.

Even when processing conditions relating to a plurality of pieces of element data db that serve as training data (and estimation targets) are the same, there may be slight differences that are extremely difficult to eliminate. Even when composition of workpieces 101 are the same, for example, components and/or physical properties may be slightly different from one another between different suppliers and, even with the same supplier, components and/or physical properties may be slightly different from one another depending on a lot. In addition, for example, it may be difficult to maintain a temperature environment of the machine tool 1. Such slight differences may be likely to cause unpredictable variation in measured values of a physical quantity (and the amount of wear), and the variation may be likely to reduce the accuracy of estimating the amount of wear. When clustering is performed, effects of such slight differences relating to processing conditions may be eliminated, thereby improving the accuracy of estimating the amount of wear.

The inventors conducted an experiment for examining the accuracy of estimating the amount of wear in following three cases. In a first case, estimation models may be created, without performing clustering, using training data relating to cutting of a plurality of workpieces 101 whose lots are the same. In a second case, estimation models may be created, without performing clustering, using training data relating to cutting of a plurality of workpieces 101 whose lots are different from one another. In a third case, estimation models may be created using the same training data as in the second case while performing clustering. In each case, three types of estimation models were created in accordance with the amount of wear of each of two cutting edges and a nose (i.e., the amount of wear at different evaluation positions). Errors were then obtained by comparing estimated values of the amount of wear at a time when measurement information regarding a physical quantity of the training data is input to the model and measurement information regarding the amount of wear of the training data. The errors were compared between the three cases.

As a result of the experiment, it was found that estimation accuracy in the second case was lower than that in the first case. It was also found that estimation accuracy in the third case was higher than that in the second case. Furthermore, the estimation accuracy in the third case was even higher than that in the first case depending on the evaluation positions of the amount of wear. It was thus confirmed that effects of lots could be reduced and high estimation accuracy could be achieved through clustering. From another perspective, it was confirmed that accuracy of estimating the amount of wear for a lot different from one used to obtain training data could be improved.

In the present embodiment, element data db may include, as measurement information Pa regarding a physical quantity, at least one feature value (e.g., a statistical value and a parameter of a spectrum) obtained from time-series data De regarding a measured value of the physical quantity. In the clustering step, the clustering unit 37 may cluster a plurality of pieces of element data db on the basis of one or more first feature values included in the at least one feature value. In the model creation step, the model creation unit 39 may create a model 41 for obtaining estimation information Wb regarding the amount of wear from one or more second feature values (may be the same as or different from the first feature values) included in the at least one feature value on the basis of the second feature values and measurement information Wa regarding the amount of wear.

In this case, for example, the estimation accuracy can be improved by selecting a feature value in accordance with a type of cutting tool and processing conditions. In addition, for example, an effect of variation in the physical quantity singularly caused regardless of the amount of wear can be easily reduced.

In addition, in the present embodiment, at least the one or more first feature values or the one or more second feature values may include statistical values of measured values of the physical quantity included in time-series data De.

In this case, for example, the above-described effect may improve. That is, the estimation accuracy can be improved by selecting statistical values in accordance with a type of cutting tool and processing conditions. In addition, for example, an effect of variation in the physical quantity singularly caused regardless of the amount of wear can be easily reduced by employing an average.

In addition, in the present embodiment, at least the one or more first feature values or the one or more second feature values may include a parameter (e.g., at least one of a plurality of parameters) representing a frequency spectrum obtained from time-series data De.

Because the feature values in this case become an overall evaluation of vibration, for example, an estimation model 41 can accurately reflect a correlation between vibration and the amount of wear, and the accuracy of estimating the amount of wear can be improved. It may be needless to say that an effect of vibration in the physical quantity singularly caused regardless of the amount of wear can be easily reduced.

In addition, in the present embodiment, the one or more first feature values used for clustering and the one or more second feature values used to create a model may be partially different from each other.

In this case, for example, feature values for creating an estimation model 41 can be set again after the clustering. In the clustering, for example, the user may select the first feature values used for the clustering. Thereafter, in the creation of a model after the clustering, an AI technique may be used, and second feature values as various as possible (all the first feature values may be included) may be input. Such a method may make it easier to improve the estimation accuracy.

In addition, in the present embodiment, the data obtaining unit 36 may obtain element data db at least at a certain sampling time (e.g., the time t1 in FIG. 9) for each of a plurality of cutting tools 3A in the data obtaining step. In the clustering step, the clustering unit 37 may perform clustering using only the element data db at the certain sampling time among a plurality of pieces of element data db. In addition, the clustering unit 37 may classify element data db at other sampling times (e.g., the times t2, t3, t4, and t5 in FIG. 9) among the plurality of pieces of element data db into a cluster to which the element data db at the certain sampling time obtained for the same cutting tool 3A as the cutting tool 3A for which the element data db has been obtained belongs.

In this case, for example, a processing load of clustering can be reduced. In addition, by not performing clustering using element data db at all sampling times but selecting a certain sampling time for clustering, the accuracy of estimating the amount of wear can be improved.

In the present embodiment, for example, the certain sampling time may be a time after each of a plurality of cutting tools 3A has finished cutting a certain number of workpieces and cutting of a next workpiece progresses to a certain stage.

In this case, for example, the certain sampling time may be set after initial wear. In the initial wear, since a mode of wear has not stabilized, for example, singular values may tend to be measured. By performing clustering without using measurement information regarding the physical quantity obtained in such a period, for example, a stable correlation between the physical quantity and the amount of wear around a time at which an end of life comes can be easily found. The accuracy of estimating wear accordingly may improve.

In the data obtaining step, the data obtaining unit 36 may obtain measurement information Wa regarding the amount of wear of the same cutting tool 3A at two sampling times (e.g., the times t1 and t4 in FIG. 8). The data obtaining unit 36 may also obtain measurement information Pa regarding the physical quantity at the two sampling times (t1 and t4) and one or more other sampling times (e.g., the times t2, t3, and t5 in FIG. 8). The data obtaining unit 36 may interpolate measurement information Wa regarding the amount of wear at the one or more other sampling times on the basis of the measurement information Wa regarding the amount of wear at the two sampling times. As a result, the data obtaining unit 36 may obtain element data db at the two sampling times and the one or more other sampling times. In this case, as described above, the amount of wear need not be measured while stopping the machine tool 1 at all the sampling times. As a result, a load of obtaining training data may be reduced. From another perspective, since a load of measuring the amount of wear does not increase even if the number of sampling times increases, the number of sampling times for obtaining measurement information regarding the physical quantity can be increased. As a result, accuracy of the estimation model 41 may improve.

In addition, in the present embodiment, the element data db may include information Df (FIG. 11) regarding workpieces (workpieces 101) cut by the cutting tool 3A in addition to the measurement information Pa regarding the physical quantity and the measurement information Wa regarding the amount of wear. In the clustering step, the clustering unit 37 may cluster the plurality of pieces of element data db on the basis of the information Df regarding the workpieces 101 in addition to the measurement information Pa regarding the physical quantity.

In this case, for example, slight differences between the workpieces 101 may be directly reflected by the clustering. As a result, if the slight differences between the workpieces 101 are affecting the estimation accuracy, the estimation accuracy may be expected to improve.

In addition, in the present embodiment, a physical quantity used to estimate the amount of wear may be acceleration. In addition, in the clustering step, the clustering unit 37 may perform the clustering using k-means and determine the number of clusters using a gap statistic. In the model creation step, the model creation unit 39 may create an estimation model 41 through a regression analysis.

In this case, since acceleration, which highly correlates with the amount of wear, is used, for example, the estimation accuracy may improve. In addition, since k-means and a regression analysis, which are known methods, are used, for example, the techniques in the present disclosure can be easily used.

The techniques in the present disclosure are not limited to the above embodiment, and may be implemented in various modes.

For example, part of the processing described in the embodiment as being performed by the estimation system 31 may be performed by the user, instead. In addition, various pieces of data may be appropriately processed by the user, instead. For example, singular element data db (e.g., element data db whose distance from a representative point Pr of a cluster to which the element data db belongs is singularly large) may be removed from a plurality of pieces of cluster-specific data Dc obtained by the estimation system 31 at the user's discretion, and the estimation system 31 may perform clustering again.

The invention claimed is:

1. A method for creating an amount of wear estimation model, the method comprising:
   a data obtaining step of obtaining, for at least one cutting tool in a machining system at a plurality of sampling times, data in which measurement information regarding an amount of wear of the cutting tool and measurement information regarding a physical quantity, which correlates with the amount of wear, of the cutting tool during cutting are associated with each other;

a clustering step of clustering a plurality of pieces of the obtained data on a basis of the measurement information regarding the physical quantity included in each of the plurality of pieces of data; and a model creation step of creating, for each of clusters on a basis of the measurement information regarding the physical quantity and the measurement information regarding the amount of wear included in the data, a model for obtaining estimation information regarding the amount of wear from new measurement information regarding the physical quantity, wherein the data obtaining step includes:

obtaining time-series data by accumulating measured values of vibration of the cutting tool measured during cutting, the time-series data being provided by a sensor provided for the cutting tool or by a recording medium, generating at least one feature value from the time-series data, the clustering step includes clustering the plurality of pieces of the obtained data on a basis of the generated at least one feature value, and the model is created for each of the clusters to reflect a correlation between the vibration and the amount of wear for estimating cutting tool wear, and the created model estimates whether an end of life of the cutting tool has come to control replacement of the cutting tool.

2. The method according to claim 1, wherein, in the clustering step, the plurality of pieces of data are clustered on a basis of one or more first feature values included in the generated at least one feature value, and wherein, in the model creation step, the model for obtaining the estimation information regarding the amount of wear is created from one or more second feature values included in the generated at least one feature value on a basis of the one or more second feature values and the measurement information regarding the amount of wear.

3. The method according to claim 2, wherein at least the one or more first feature values or the one or more second feature values include a statistical value of the measured values of the physical quantity included in the time-series data.

4. The method according to claim 2, wherein at least the one or more first feature values or the one or more second feature values include a parameter representing a frequency spectrum obtained from the time-series data.

5. The method according to claim 2, the one or more first feature values and the one or more second feature values are at least partially different from each other.

6. The method according to claim 1, wherein, in the data obtaining step, the data at least at a certain sampling time is obtained for each of a plurality of cutting tools, and wherein, in the clustering step, the clustering is performed using, among the plurality of pieces of data, only data at the certain sampling time, and data at other sampling times among the plurality of pieces of data is classified into a cluster to which the data at the certain sampling time obtained for a same cutting tool as a cutting tool for which the data has been obtained belongs.

7. The method according to claim 6, wherein the certain sampling time is a time when each of the plurality of cutting tools has cut a certain number of workpieces or cut, to a certain stage, a workpiece immediately after the certain number of workpieces.

8. The method according to claim 1, wherein, in the data obtaining step, measurement information regarding the amount of wear at two of the sampling times is obtained for a same cutting tool, measurement information regarding the physical quantity is obtained at the two sampling times and another one or more of the sampling times, measurement information regarding the amount of wear at the other one or more sampling times is interpolated on a basis of the measurement information regarding the amount of wear at the two sampling times, and, as a result, the data is obtained at the two sampling times and the other one or more sampling times.

9. The method according to claim 1, wherein the data includes information regarding a workpiece cut by the cutting tool in addition to the measurement information regarding the physical quantity and the measurement information regarding the amount of wear, and wherein, in the clustering step, the plurality of pieces of data are clustered on a basis of the information regarding the workpiece in addition to the measurement information regarding the physical quantity.

10. The method according to claim 1, wherein the physical quantity is acceleration, wherein, in the clustering step, the clustering is performed using k-means and a number of clusters is determined using a gap statistic, and wherein, in the model creation step, the model is created through a regression analysis.

11. A method for estimating an amount of wear using the model created by the method according to claim 1, the method comprising:

a measurement information obtaining step of obtaining measurement information regarding the physical quantity of a cutting tool different from the cutting tool used to create the model;

a cluster selection step of selecting, among the plurality of clusters, a cluster into which the measurement information regarding the physical quantity obtained in the measurement information obtaining step is classified; and an estimation step of obtaining estimation information regarding the amount of wear by applying the measurement information regarding the physical quantity obtained in the measurement information obtaining step to the model corresponding to the selected cluster.

12. An amount of wear estimation model creation apparatus comprising:

a processor implementing:

a data obtaining unit that obtains, for at least one cutting tool in a machining system at a plurality of sampling times, data in which measurement information regarding an amount of wear of the cutting tool and measurement information regarding a physical quantity, which correlates with the amount of wear, of the cutting tool during cutting are associated with each other;

a clustering unit that clusters a plurality of pieces of the obtained data on a basis of the measurement information regarding the physical quantity included in each of the plurality of pieces of data; and a model creation unit that creates, for each of clusters on a basis of the measurement information regarding the physical quantity and the measurement information regarding the amount of wear included in the data, a model for obtaining estimation information regarding the amount of wear from new measurement information regarding the physical quantity, wherein the data obtaining unit obtains time-series data by accumulating measured values of vibration of the cutting tool measured during cutting, the time-series data being provided by a sensor provided for the cutting tool or by a recording medium, and generates at least one feature value from the time-series data, the clustering unit clusters the plurality of pieces of the obtained data on a basis of the generated at least one feature value, and the model creation unit creates the model for each of the clusters to reflect a correlation between the vibration and the amount of wear for estimating cutting tool wear.

13. A non-transitory storage medium that stores a program for causing a computer functioned as the amount of wear estimation model creation apparatus according to claim 12 to create an amount of wear estimation model.

14. An amount of wear estimation apparatus that estimates an amount of wear using the model created by the amount of wear estimation model creation apparatus according to claim 12, the amount of wear estimation apparatus comprising:

a processor implementing:

a measurement information obtaining unit that obtains measurement information regarding the physical quantity of a cutting tool different from the cutting tool used to create the model;

a cluster selection unit that selects, among the plurality of clusters, a cluster into which the measurement information regarding the physical quantity obtained by the measurement information obtaining unit is classified; and an estimation unit that estimates estimation information regarding the amount of wear by applying the measurement information regarding the physical quantity obtained by the measurement information obtaining unit to the model corresponding to the selected cluster.

15. A non-transitory storage medium that stores a program for causing a computer functioned as the amount of wear estimation apparatus according to claim 14 to estimate an amount of wear.

* * * * *